United States Patent
Pezaris

(10) Patent No.: US 10,782,937 B2
(45) Date of Patent: Sep. 22, 2020

(54) SYSTEMS AND METHODS FOR PROVIDING AN INSTANT COMMUNICATION CHANNEL WITHIN INTEGRATED DEVELOPMENT ENVIRONMENTS

(71) Applicant: CodeStream, Inc., New York, NY (US)

(72) Inventor: Peter Pezaris, New York, NY (US)

(73) Assignee: CodeStream, Inc., New York, NY (US)

(*) Notice: Subject to any disclaimer, the term of this patent is extended or adjusted under 35 U.S.C. 154(b) by 52 days.

(21) Appl. No.: 16/312,785

(22) PCT Filed: Aug. 22, 2018

(86) PCT No.: PCT/US2018/047404
§ 371 (c)(1),
(2) Date: Dec. 21, 2018

(87) PCT Pub. No.: WO2019/040543
PCT Pub. Date: Feb. 28, 2019

(65) Prior Publication Data
US 2020/0192638 A1 Jun. 18, 2020

Related U.S. Application Data

(60) Provisional application No. 62/659,346, filed on Apr. 18, 2018, provisional application No. 62/626,575, (Continued)

(51) Int. Cl.
*G06F 9/445* (2018.01)
*G06F 9/46* (2006.01)
(Continued)

(52) U.S. Cl.
CPC .......... *G06F 8/33* (2013.01); *G06F 8/41* (2013.01); *G06F 8/71* (2013.01); *G06F 8/75* (2013.01);
(Continued)

(58) Field of Classification Search
CPC .... G06F 8/33; G06F 8/71; G06F 8/654; G06F 8/77; G06F 8/20; G06F 8/34; G06F 8/36;
(Continued)

(56) References Cited

U.S. PATENT DOCUMENTS

| | | | |
|---|---|---|---|
| 6,993,710 B1 * | 1/2006 | Coad | G06F 8/71 715/202 |
| 7,810,069 B2 * | 10/2010 | Charisius | G06F 8/20 717/106 |

(Continued)

FOREIGN PATENT DOCUMENTS

WO 03038607 A1 5/2003

OTHER PUBLICATIONS

Susanne Hupfer et al., Introducing Collaboration into an Application Development Environment, 2012, [Retrieved on Jul. 1, 2020]. Retrieved from the internet: <URL: https://dl.acm.org/doi/pdf/10.1145/1031607.1031611> 4 Pages (21-24) (Year: 2004).*

(Continued)

*Primary Examiner* — Anibal Rivera
(74) *Attorney, Agent, or Firm* — Cognition IP, P.C.; Edward Steakley

(57) ABSTRACT

A method and system may be provided for recording discussions about computer code in an integrated development environment ("IDE"). In some aspects, a communication channel is integrated with an IDE. Communications and discussions may be tracked and linked with specific code sections.

24 Claims, 20 Drawing Sheets

Related U.S. Application Data filed on Feb. 5, 2018, provisional application No. 62/548,776, filed on Aug. 22, 2017.

(51) Int. Cl.

| | |
|---|---|
| *G06F 9/44* | (2018.01) |
| *G06F 8/75* | (2018.01) |
| *G06F 8/33* | (2018.01) |
| *G06F 8/71* | (2018.01) |
| *G06F 8/41* | (2018.01) |
| *G06F 8/77* | (2018.01) |
| G06F 8/30 | (2018.01) |
| G06F 8/20 | (2018.01) |

(52) U.S. Cl.
CPC .................. *G06F 8/77* (2013.01); *G06F 8/20* (2013.01); *G06F 8/30* (2013.01)

(58) Field of Classification Search
CPC ... G06F 8/75; G06F 8/73; G06F 11/36; G06F 11/368; G06F 11/3664; G06F 9/455; G06F 9/452
See application file for complete search history.

(56) References Cited

U.S. PATENT DOCUMENTS

| | | | | |
|---|---|---|---|---|
| 8,453,112 | B1* | 5/2013 | Brambley | G06F 8/71 717/110 |
| 9,086,885 | B2* | 7/2015 | Canter | G06F 8/34 |
| 9,348,579 | B2* | 5/2016 | Xia | G06F 8/654 |
| 9,652,225 | B1* | 5/2017 | Bohn | G06F 16/00 |
| 9,910,837 | B2* | 3/2018 | Kumarasamy Mani | G06Q 10/10 |
| 10,503,822 | B1* | 12/2019 | Spencer | G06F 40/194 |
| 2004/0205200 | A1* | 10/2004 | Kothari | G06F 8/20 709/229 |
| 2005/0114475 | A1* | 5/2005 | Chang | H04L 67/327 709/220 |
| 2006/0026251 | A1* | 2/2006 | Cheng | G06Q 10/10 709/207 |
| 2006/0041440 | A1* | 2/2006 | Cheng | G06Q 10/063118 705/7.17 |
| 2006/0206860 | A1 | 9/2006 | Dardinski et al. | |
| 2007/0283321 | A1* | 12/2007 | Hegde | G06F 8/71 717/110 |
| 2008/0005235 | A1* | 1/2008 | Hegde | G06Q 10/10 709/204 |
| 2008/0086718 | A1* | 4/2008 | Bostick | G06F 8/71 717/120 |
| 2008/0134298 | A1* | 6/2008 | Nathan | G06F 8/20 726/4 |
| 2008/0244418 | A1* | 10/2008 | Manolescu | G06Q 10/00 715/753 |
| 2009/0064102 | A1* | 3/2009 | Barcia | G06F 8/75 717/113 |
| 2009/0103902 | A1* | 4/2009 | Matsuura | G06F 11/3664 386/240 |
| 2009/0133006 | A1 | 5/2009 | Cheung | |
| 2009/0216581 | A1* | 8/2009 | Carrier | G06Q 10/10 705/7.25 |
| 2011/0099549 | A1* | 4/2011 | Sriraghavan | G06Q 10/101 718/100 |
| 2011/0296372 | A1* | 12/2011 | Bird | G06Q 30/06 717/102 |
| 2012/0210298 | A1* | 8/2012 | Hodgins | G06F 8/71 717/113 |
| 2013/0111428 | A1* | 5/2013 | Begel | G06F 8/34 717/101 |
| 2013/0124268 | A1* | 5/2013 | Hatton | G06Q 10/063112 705/7.38 |
| 2014/0047413 | A1* | 2/2014 | Sheive | G06F 8/30 717/110 |
| 2014/0068545 | A1* | 3/2014 | Lehmann | G06Q 10/103 717/101 |
| 2014/0173561 | A1* | 6/2014 | Toub | G06F 8/73 717/123 |
| 2014/0282097 | A1 | 9/2014 | Edlund et al. | |
| 2015/0040101 | A1* | 2/2015 | Rummler | G06Q 10/101 717/113 |
| 2015/0160931 | A1* | 6/2015 | Glazer | G06F 9/452 717/109 |
| 2015/0301806 | A1* | 10/2015 | Leon | G06F 9/45512 717/113 |
| 2016/0004529 | A1* | 1/2016 | Xia | G06F 8/20 717/178 |
| 2016/0048486 | A1 | 2/2016 | Lopategui | |
| 2016/0063840 | A1* | 3/2016 | Kumarasamy Mani | H04L 67/22 340/540 |
| 2016/0070547 | A1* | 3/2016 | Ramanathan | G06F 8/77 717/107 |
| 2016/0179479 | A1* | 6/2016 | Bates | G06F 8/34 717/113 |
| 2016/0179508 | A1* | 6/2016 | Bates | G06F 8/73 717/121 |
| 2016/0224337 | A1* | 8/2016 | Xia | G06F 8/71 |
| 2016/0371079 | A1 | 12/2016 | Balasubramanian et al. | |
| 2017/0090704 | A1* | 3/2017 | Hu | H04L 51/046 |
| 2017/0289210 | A1* | 10/2017 | Pai | G06F 40/197 |
| 2017/0357486 | A1* | 12/2017 | DeLuca | G06F 8/30 |
| 2018/0012181 | A1* | 1/2018 | Blincoe | G06K 9/6201 |
| 2018/0046455 | A1* | 2/2018 | Walsh | G06F 8/71 |
| 2019/0004925 | A1* | 1/2019 | Buckingham | G06F 8/71 |
| 2019/0213101 | A1* | 7/2019 | Raviv | G06F 8/33 |
| 2019/0272171 | A1* | 9/2019 | Chen | G06F 8/77 |
| 2019/0303140 | A1* | 10/2019 | Kelly | G06Q 10/063112 |

OTHER PUBLICATIONS

Christof Ebert et al., Collaboration Tools for Global Software Engineering, IEEE 2010, [Retrieved on Jul. 1, 2020]. Retrieved from the internet: <URL: https://ieeexplore.ieee.org/stamp/stamp.jsp?tp=&arnumber=5420797> 4 Pages (52-55) (Year: 2010).*

International Search Report & Written Opinion for International Application No. PCT/US2018/047404, dated Nov. 21, 2018; 19 pages.

International Search Report & Written Opinion for International Application No. PCT/US2018/046558 dated Aug. 22, 2018; 11 pages.

* cited by examiner

```
Atom  File  Edit  View  Selection  Find  Packages  Window  Help                      ⊙ ⊛ ⊗ ✱ ☁ 🔋 61%  Fri Jul 14 11:36 AM  Peter Pezaris  Q
☐ cider-view.js — ~/github/cider
```

```
▽ ☐ cider            │ cider-view.js
  › 🗀 .git           │
  › 🗀 keymaps        │ cider.js
  ▽ 🗀 lib            │ 74   serialize() {
    › 🗀 controllers  │ 75     return {                                    ┌─ 206
    › 🗀 locales      │ 76       ciderViewState: this.ciderView.serialize()│ ┌── You are counting on lines
    › 🗀 util         │ 77     };                                          │ │   100-102
    ▽ 🗀 views        │ 78   }                                             │ └───
      ☐ cider-view.js │ 79                                               ←─┘         ── 223
      ☐ cider.js      │ 80   show() {                              ── 204
    ☐ commit-tab-view.coffee │ 81     this.modalPanel.show();
    ☐ commit-tab.coffee      │ 82     this.ciderView.focus_input();
    ☐ config-scheme.json     │ 83     this.ciderView.resize_stream();
    ☐ git-blame.js           │ 84   }
    ☐ onboard-tab-view.coffee│ 85
    ☐ onboard-tab.coffee     │ 86   hide() {
    ☐ person-tab-view.coffee │ 87     this.modalPanel.hide();
    ☐ person-tab.coffee      │ 88   }
  › 🗀 menus                  │ 89
  › 🗀 node_modules           │ 90   toggle() {
  › 🗀 spec                   │ 91     return (
  › 🗀 styles                 │ 92       this.modalPane.isVisible() ? this.hide() : this.show()
    ☐ _DS_Store               │ 93     );
    ☐ .gitignore              │ 94   }
    ☐ CHANGELOG.md            │ 95
    ☐ LICENSE.md              │ 96   comment() {
    ☐ package.json            │ 97     this.ciderView.add_comment();
    ☐ README.md               │ 98   }                                               ┌── 225
                              │ 99                                                   │ ── 216
                              │100   some_random_function_you_may_delete() { ── 230  │
                              │101     // brought to you by Larry                    │ Larry Wall: Why is this done?
                              │102   }
                              │103 }
                              │104
                              │105   // JJ's line
                              │106   // Larry's line
```

SYSTEMS AND METHODS FOR PROVIDING AN INSTANT COMMUNICATION CHANNEL WITHIN INTEGRATED DEVELOPMENT ENVIRONMENTS

CROSS-REFERENCE TO RELATED APPLICATIONS

This application is a 35 U.S.C. § 371 national stage application of PCT International Application No. PCT/US18/47404, filed on Aug. 22, 2018, which claims the benefit of U.S. Provisional Application No. 62/659,346, filed on Apr. 18, 2018, U.S. Provisional Application No. 62/626,575, filed on Feb. 5, 2018, and U.S. Provisional Application No. 62/548,776, filed on Aug. 22, 2017. The above-referenced PCT International Application No. PCT/US18/47404 is hereby incorporated by reference in its entirety.

BACKGROUND

Conventional systems for software development incorporate many enhancements to facilitate the development of code, updates, and code modifications. A variety of integrated development environments ("IDE") exist to provide the necessary architecture to organize code development tasks, as well as manage distribution of those tasks across development groups. Unfortunately, coordination of work remains a significant challenge. The need for merging and reconciliation of code changes remains a significant stumbling block, causing inconsistencies and internal conflict within developed code.

SUMMARY

It is realized that the lack of record beyond tracked changes in the IDE, including for example, the lack of record of discussions about specific problems in the code, specific issues being resolved, etc., leads to increased issues with code divergence, conflict, and errors. According to various aspects, many of the issues with conventional IDEs and code development in general can be resolved with an integrated communication channel. According to another aspect, all communications and discussions can be tracked and linked with specific code sections (e.g., line, lines, code file, code tree elements, etc.). Thus, any identified problem, issues and/or planned resolution can be readily accessible to all the developers in a group. For example, based on linking discussions and communications to specific code as the code is being development, makes the collective knowledge of the development cycle accessible to all subsequent reviewers.

According to one embodiment, a real time communication channel is integrated into an IDE application as a plugin executable. The plugin executable can be configured to update an IDE application to display a communication stream alongside of code editing windows or displays. In one example, a user installs the plugin into their IDE application and activates it via selection in the user interface ("UI") or by selection of special key or keys. Once activated, the plugin is visualized as a communication panel appearing adjacent to code editor displays. The communication panel provides a real time chat stream between users (e.g., developers). The real time communication stream also provides a real time activity screen. For example, users receive communications and also notifications of activity occurring within the code being developed. According to another example, the activity notification provides a direct link to explore the changes, modifications, or updates associated with notification.

According to another aspect the system can be configured to dynamically identify and link messaging, message threads, and/or any communication channel to select segments of code. In further aspects, the system is configured to dynamically adjust the definition of the code segments that the respective messages are tied to. In one example, a particular code segment (e.g., group of code lines) could be lifted completely from one source file and moved to another. Without dynamic tracking of the code segment, the original message thread tied to the location of the original code segment would be orphaned and ultimately lost. This is a failure of many conventional message tracking systems, which various embodiments discussed herein resolve. Various examples of the system provide functionality not enabled by conventional approaches and/or conventional computer systems.

In one example, the system implements dynamic machine leaning algorithms that enable the system to automatically identify changes within a code segment (e.g., expansion of a method or named function to a greater number of code lines, changes in numbers of line of code, etc.). Machine learning can analyze code to develop matching protocols (e.g., capture and match on method names, variable name, specific code snippets (e.g., function calls, wrappers, etc.)) that can run in background to identify moved code, new locations, and/or re-introduced code.

The system is also configured to use changes within code segments to update metadata on the code segment. For example, the system analyzes changes so that an expanded code segment (e.g., lines 10-25 from lines 10-20) are linked to a message thread about that code segment. In one example, an algorithm is implemented on the system to analyze content of respective message threads and extract information for updating metadata links to message threads (e.g., "I added code lines 12-15 to method (xxxxx) to fix the locking problem). The system automatically increases the linked code segment definition by the added lines. In other embodiments, the system can implement monitoring algorithms (alone or in addition to other detection algorithms) that identify changes to code segments as they are made, and identifies changes that are used to update metadata linked messages, communications, and/or threads.

In various embodiments, the metadata on the respective code segments are stored separately from the code, code revision, and/or source files. In some examples, the separately stored metadata can be retained for the life of the software project, enabling future use of the metadata, context information, matching information, etc. In one example, this enables the system to identify and match even on deleted code to re-capture and leverage prior messaging and development context.

In yet other embodiments, older versions of code can be linked to the newest and most useful message threads. Often old code is needed to diagnose or test for issues in newer versions. In other alternatives, older versions of code may represent a more stable versions. Often such reversal to old versions comes with significant sacrifice (e.g., any new developments fixes, etc.) and may include re-introduction of long forgotten bugs. Metadata records of the messages and communication between developer can not only identify such issued but retain the specific fixes implemented to resolve. In some circumstances, it could be the fixes themselves that resulting in the new programs instability, but without the linkage between current message thread and especially old versions of code—developers are provided no capability to re-capture prior development context in various conventional systems.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 1 is an example screen capture of a user interface ("UI"), according to one embodiment;

FIGS. 2A-B are screen captures of an example UI, according to one embodiment;

FIGS. 3-6 are example screen captures of an example UI, according to one embodiment;

FIGS. 7A-B are example screen captures of an example UI, according to one embodiment;

FIGS. 8A-8B are example screen captures of an example UI, according to one embodiment;

FIG. 9 is an example screen capture of an example UI, according to one embodiment;

FIGS. 13-16 are example screen captures of an example UI, according to one embodiment.

DETAILED DESCRIPTION

Figure 10:
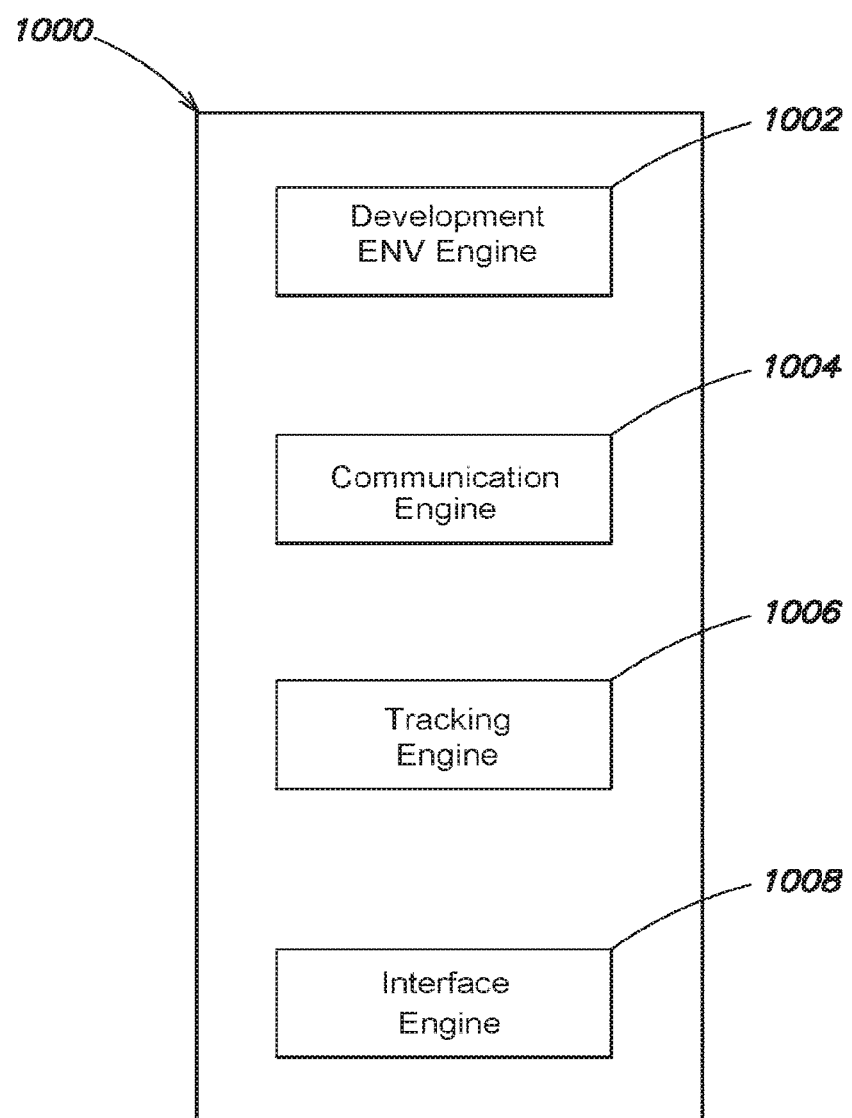
FIG. 10 is a is a block diagram of a communication system for providing a real-time communication channel in a software development environment, according to one embodiment.

Stated broadly various aspects describe the integration of a communication channel into source code development environments. The source code development environments may also incorporate version control systems or services to facilitate code development. In some embodiments, a real time communication channel is integrated into an IDE application. The integration may be based on a plugin or extension to the IDE environment. In further embodiments, the real time communication channel is configured to display a communication stream alongside of code editing windows or displays. In one example, a user installs the plugin into their IDE application and activates it via selection in the user interface ("UI") or by selection of special key or keys. Once activated, the communication panel is configured to appear adjacent to code editor displays and link user communications to specific portions of the code, code tree, or coded functions, among other options. The communication panel provides a real time chat stream between users. The real time communication stream also provides information on code related activity in real time. For example, users receive communications and also notifications of activity occurring within the code being developed. According to another example, the activity notifications provide a direct link to code that enables users to explore the changes, modifications, or updates associated with notification.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, any combination of, and all of the described terms.

Figure 1:
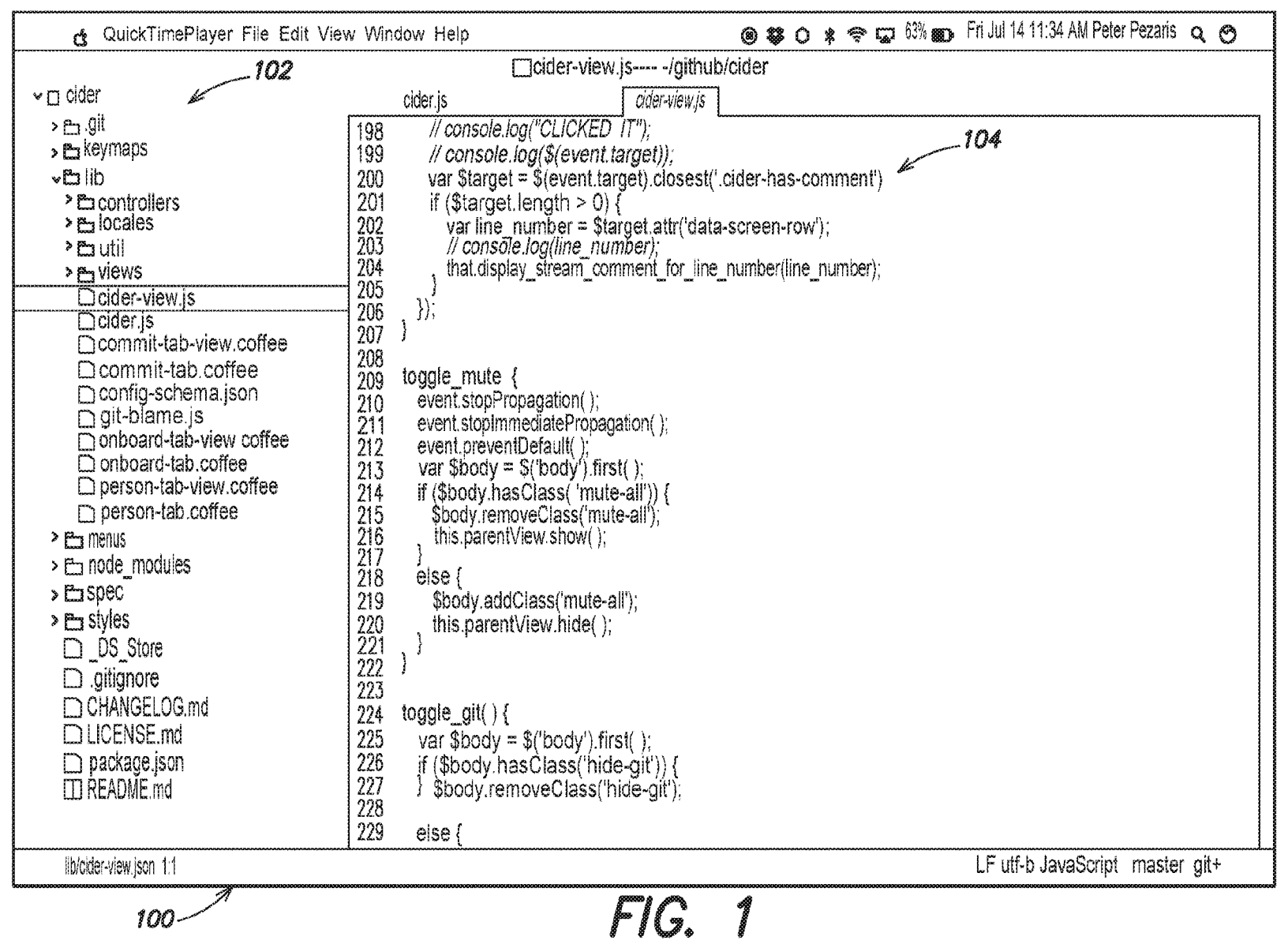
Figure 2A:
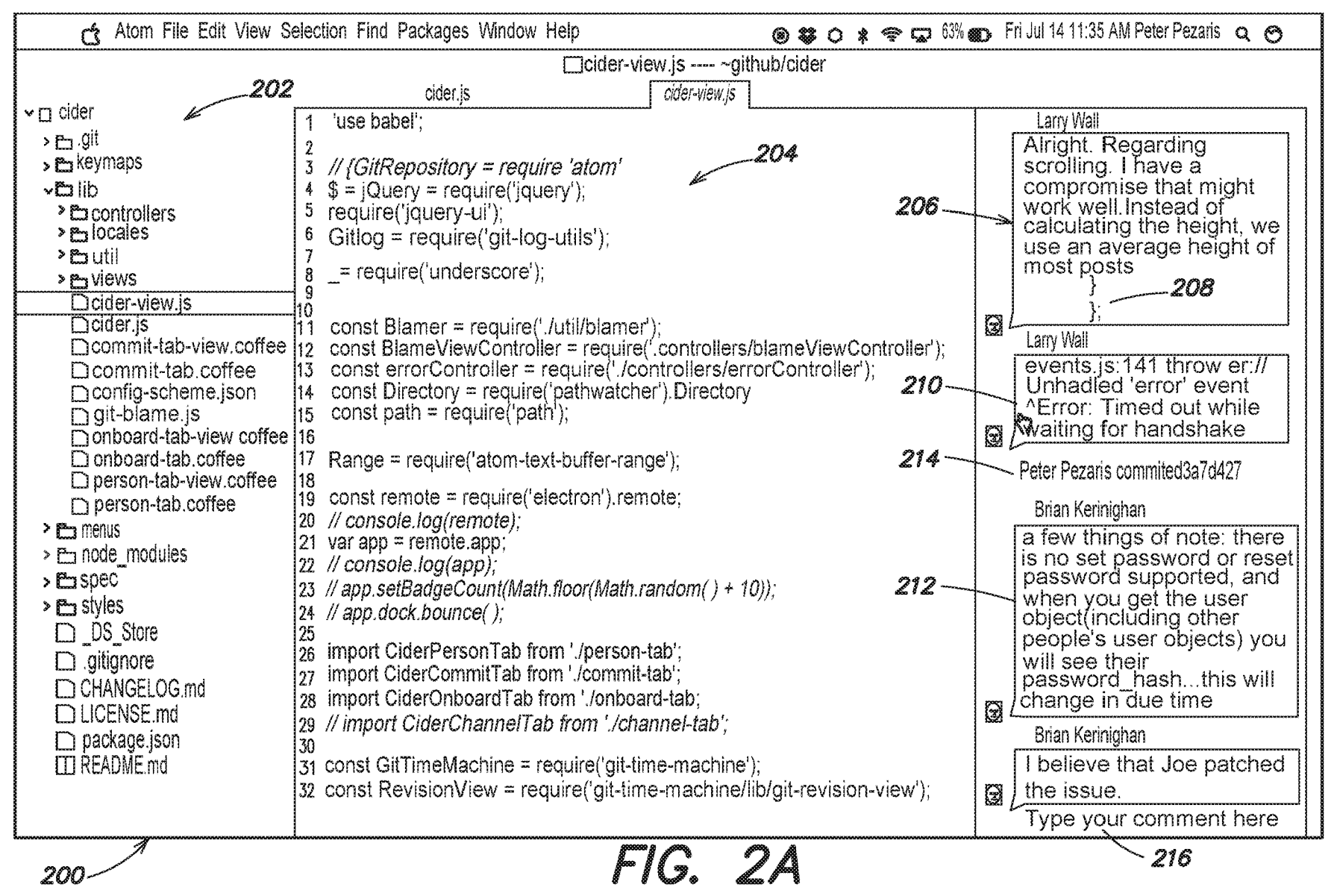

FIG. 1 is a screen capture of an example user interface (UI), showing an integrated development environment 100. The IDE 100 includes a navigation panel 102 organizing source code files, configuration files, libraries, etc. Once files are selected in the navigation panel 102, the editing panel 104 is configured to display the associated file/code for editing in the UI. FIG. 2 is a screen capture of an example UI 200, showing the IDE with the communication plugin enabled. For example, once a user installs the plugin onto their IDE application (e.g., ATOM) a real time communication stream is configured to be displayed in a communication panel 206. In some examples, the plugin must be activated by the user, by selection in the UI or selection of special keys, and once active display 206 appears in the UI.

Messages (e.g., 208, 210, and 212) are displayed chronologically in the communication stream associated with a directory or file being displayed in the editing panel 204. In addition to user messages, the communication panel 206 is configured to display notifications (e.g., 214) associated with the file or directory being accessed (i.e., visualized in panel 204). According to some embodiments, the integration of the communication channel and tracking of message streams and notifications provide significant enhancement over convention development approached. For example, under conventional development approaches the user would need to switch to a message application or service to start a communication stream, moreover, the user would have to determine the party with which they wish to communication which would require accessing yet another application.

According to some embodiments, creating a message to another user (e.g., a developer) is streamlined by typing into a text input box at 216. According to another embodiment, utilizing additional features provided by the communication plugin, a user can select portions of code (e.g., via highlighting by mouse or other pointing device) and begin a message associated specifically with the selected portion of code. Once selected in the UI, the system is configured to maintain a reference to a block/section of code in response to selection in the UI. According to one embodiment, the reference is embedded in a message and can be stored on the system and accessed when messages are displayed or read. For example, the references, along with a copy of the code itself, can be stored on the system or as an attachment to the message, and can be included as part of the message metadata.

FIG. 2B is an example user interface showing a portion of code 230 selected in the editing panel 204, and an associated message being generated in the communication panel 206. The system enables the user to enter text at 216, responsive to an indication the user wants to create a message regarding the highlighted code segment (e.g., right click on code segment and select message, hot key "<cntrl> m," etc.). At 223, the system displays the association between the selected code (e.g., 230) and the message being created. In some embodiments, the system is configured to analyze the selected code responsive to selection. The analyze is executed by the system to identify a recipient for the message without requiring user identification.

For example, the system analyzes author or editor information associated with the selected code segment to provide a recipient for the message automatically (e.g., at 225 the system identifies "Larry Wall" as the author of the selected code). In one example, the system identifies the code author or editor from a local repository or searches a code storage repository (e.g., git repository) for information on an author or editor for code identified in the user interface.

It is realized that such an integrated messaging panel and automatic detection of responsible parties for code elements, provides significant improvement over known development environments and communication systems. In the first instance, the user does not have to transition to a separate communication application (e.g., e-mail), and further unlike a conventional implementation, the user does not have to search a version control system to identify the author or editor of the selected code (e.g., GIT). For example, in a conventional system using GIT, a new terminal would be needed by the user to investigate the author with GIT_history or GIT_blame (i.e., access attribution records).

According to further aspects, a system for tracking comments on source code over time is provided. The system handles gracefully linkages between code segments under development and message regarding those code segment. In some examples, this is particularly challenging due to nature of software development, where code segments are dynamically altered, deleted, moved, re-named, and overwritten (e.g., intentionally or otherwise). In conventional approached, most software is developed using a decentralized version control system (VCS) which allows each developer to have a full copy of all of the files that make up a project.

During development periods, a developer might make several changes to several of these files, before sharing these changes with the rest of the team in something called a commit set. When the developer is done with her work, sometimes over several days or weeks, she can share the work with the team. This commit set describes the changes to all of the files which have changed; adding lines, deleting lines, changing lines, adding files, renaming files, etc.

Various embodiment, (and in some examples a system/application named "CodeStream") provide a mechanism to add a comment to a specific point in a file, a line in a file, or a range in a file, and in further example preserve that linkage across any changes (e.g., deletes, modifications, expansions, moves, re-names, etc.). In some embodiments, the comment is displayed in the development user interface like a chat-like block of text that a user will enter. The comment refers to a portion of the code (typically called a codeblock or referred to as a code segment—which can be identified by code line number, for example). This codeblock might start at, for example, the beginning line 12 of a file, and go all the way to the middle of line 26. The comment refers to that specific range, and in some examples is stored in a metadata file providing information on the context of the comment and including for example the line numbers associated with the comment.

Over time, as the code changes, the system gracefully (and automatically) handles lining the comment so that the comment still points to the same codeblock (even as the code block changes). Examples of changes include:—code could be added above the range currently identified, in which case perhaps the comment now should refer to lines 14-28; code removed above the range; code added within the range, in which case the comment now should refer to lines 12-36; code could be removed across one of the boundaries of the range; entire codeblock could be removed, so the comment is no longer relevant; entire codeblock could be moved to a different part of the file, or to a different file, or to a new file According to various embodiments, updates to code ranges can be applied to recalculation of the appropriate range for that comment so that it applies only to that version of the file (after the changes were made). According to various embodiments, the algorithm is configured to determine the best way to move the range, or delete the range, or modify the range as appropriate. The new locations and statuses of the range will be stored for this particular version of the file.

In yet other embodiments, over time when the file changes again, the algorithm is executed by the system to track how the comments have moved. In some examples, the system tracks cut and paste into new files, and updates metadata associated with comments or communications. In other examples, the system can analyze new code changes to determine if any previous comment or message thread match the new code—if a match results the linkage can be made. In yet other embodiments, the algorithm detects changes to existing code and can analyze the prior version to determine that the new code lines were introduced within or into the middle of the code block—in which case the system expands the linkage to the larger number of code lines. Further, the system can likewise respond and update linkage in response to deletions within the codeblock.

The messaging linkage metadata can be accessed and used to identify the most relevant messages to whatever files is being accessed in the development or version control environment. Thus, whichever version of the file a user loads into their editor (e.g., even an older version) the comments will refer to the best possible references within the code.

Figure 3:
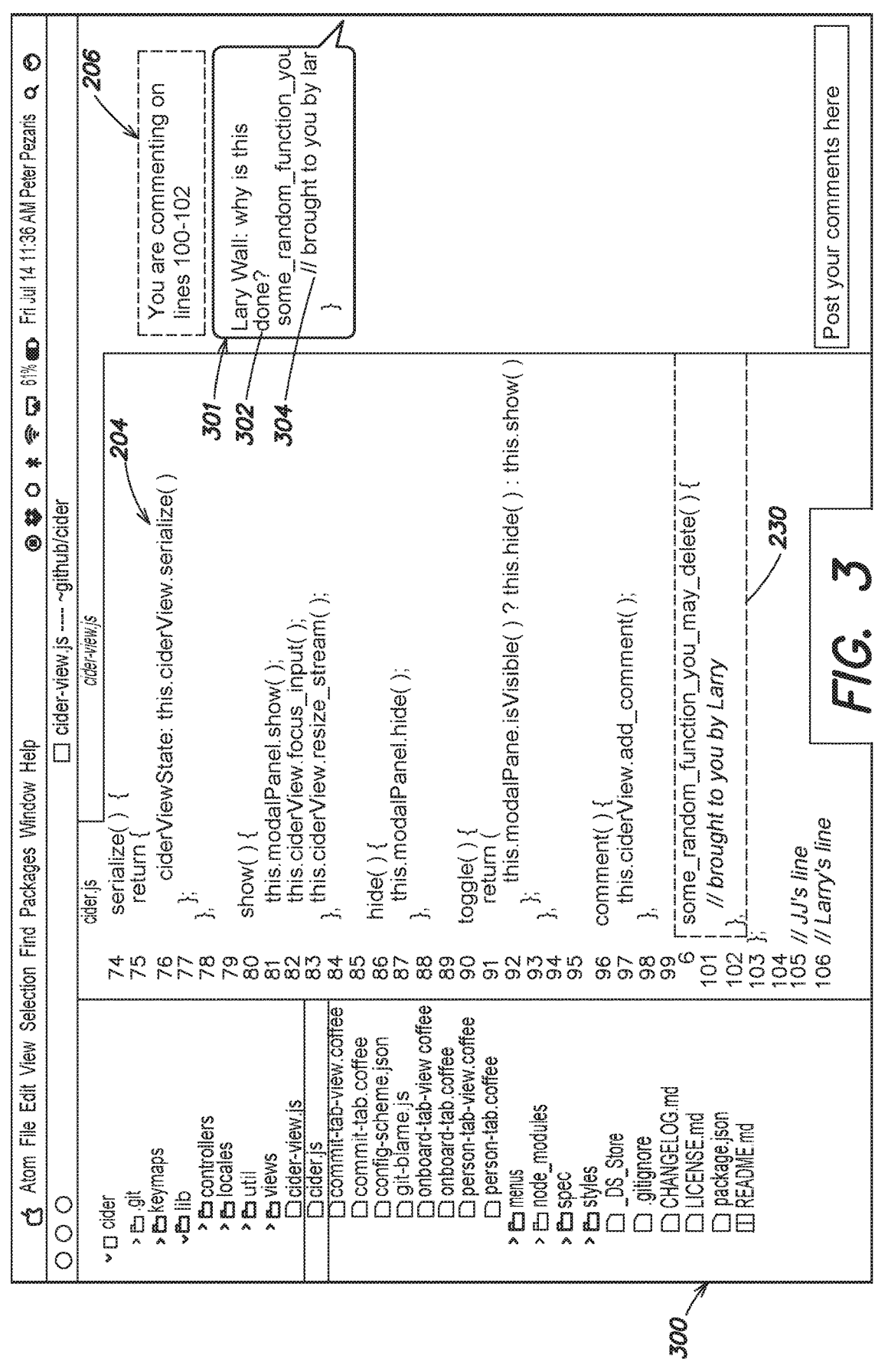

FIG. 3 is a screen capture of an example UI 300. UI 300 illustrates an example message 301 generated in the communication panel 206. The example message 301 incorporates the recipient and text of a user message at 302. The example message 301 also includes a copy of the code segment on which the author wishes to communicate. According to some embodiments, provide the code associated with the message improve the efficiency of the development environment over known approach. For example, the communication plugin provides functionality in conventional environments and reduces the operations needed to be executed in conventional environment. In other examples, inclusion of the code in the message allows the recipient to immediately understand the context of the question, and by navigating to the identified code, the user also has accessed to any preceding conversation threads and/or notification messages associated with the code.

Figure 4:
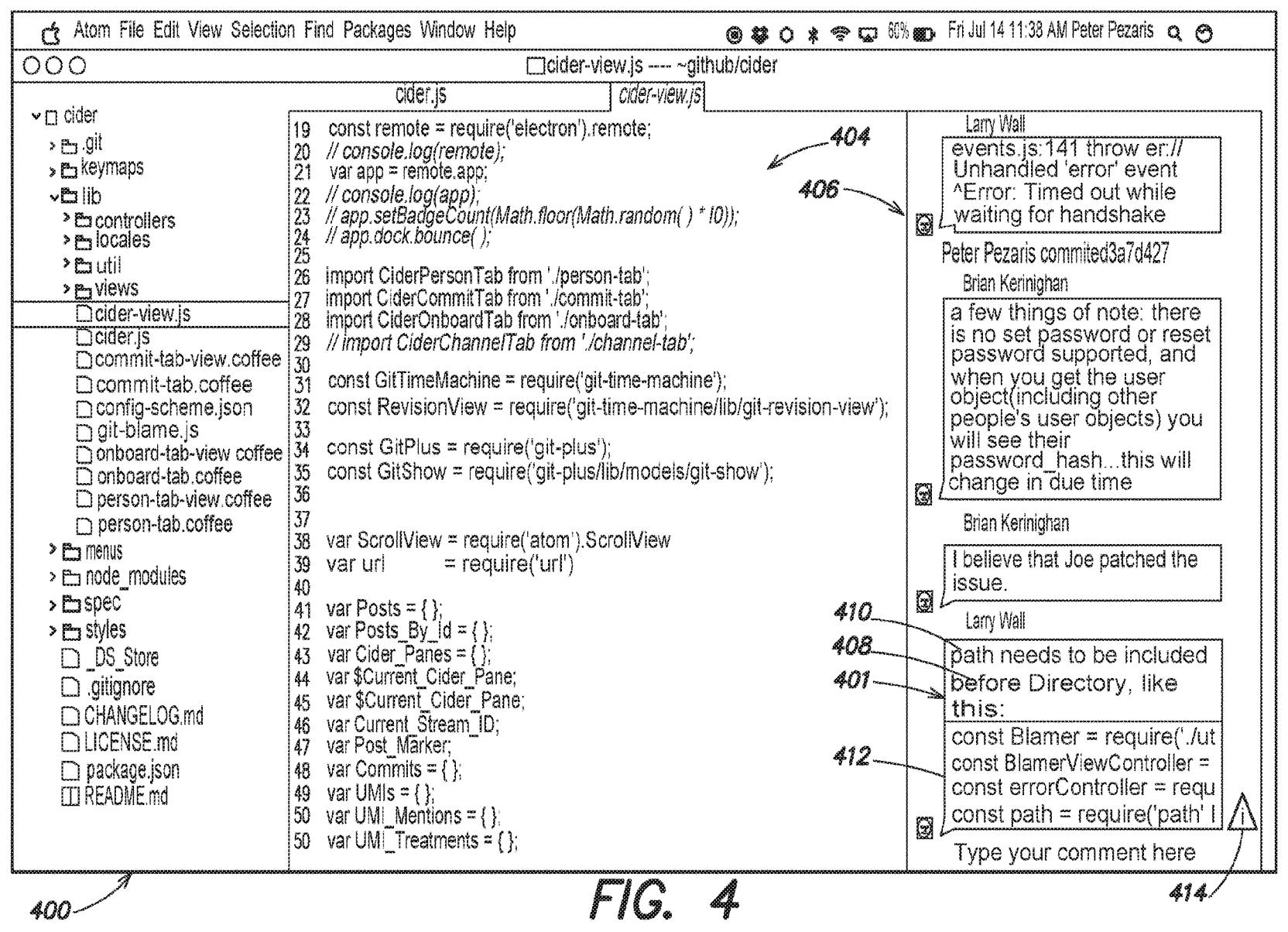

FIG. 4 is a screen capture of an example UI 400, where the user "Larry Wall" has sent a message to the author of the code. According to one embodiment, the new message 401 is displayed within the message panel 406. Matches in the message text to code elements are displayed to visual show the correspondence between the message text and code elements in the UI (e.g., at 408 and 410). Text that corresponds to code elements can be configured for selection in the UI to transition the editing panel 406 to the respective place in the code containing the segment. Similar to the example provided in FIG. 3 (e.g., at 302 and 304), the message 401 contains a visualization of the code associated with the message at 412.

According to some embodiments, the system is configured to identify changes in code, and flag that information in the user interface when constructing a message for display. For example, at 414 a visual indicator is presented (e.g., red triangle with exclamation point) to provide a visual indication, for example, of a code change in the message that reflects a different version of the code being viewed by the current user. The visual indicator can be responsive to pointer events in the UI (e.g., mouse over, and mouse over hover, etc.). In this example, a mouse over and hover operation triggers the UI to display a message "This block of code is different that your current copy."

Figure 5:
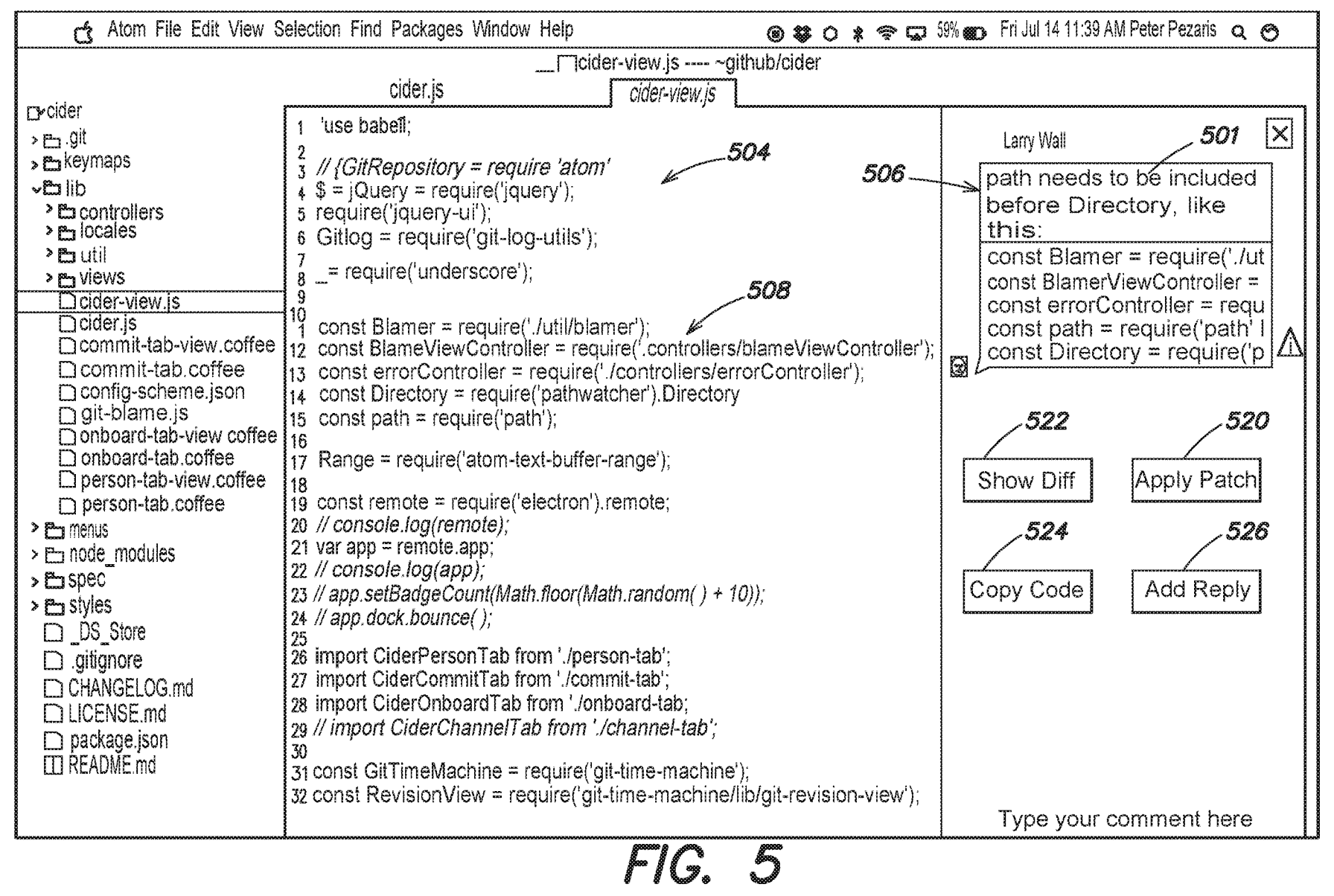

Clicking on the message 401 causes the system to transition to another view in the user interface configured to focus the user on the conversation stream associated with the code in the message. FIG. 5 illustrates an example UI showing a view of the message 501 selected in the UI displayed in a communication panel 506 with a respective message stream, and focusing on the associated code 508 in an editing panel 504. According to some embodiments, the code change message stream provides some additional functionality. For example, the communication panel provides options to the code author (e.g., original author, editing user, responsible editor, etc.) to accept a proposed code change (e.g., via selection of "Apply Patch" at 520). Other functions include "Show Diff" at 522, which triggers the system to display a code difference view in editing panel 504. The code difference view shows changes to the code in markup language. The system also provides functions to copy code at 524 and Add a Reply at 526. Selecting 526 allows the message recipient to continue the communication thread. For example, the recipient can ask why the change is necessary, and the subsequent answer is displayed in communication panel 504 in real time. According to various embodiments, the communication stream associated with the code segments is maintain for review by later users, who are then able to review the code changes, and through the message stream immediately understand the purpose or reason for such changes.

Figure 6:
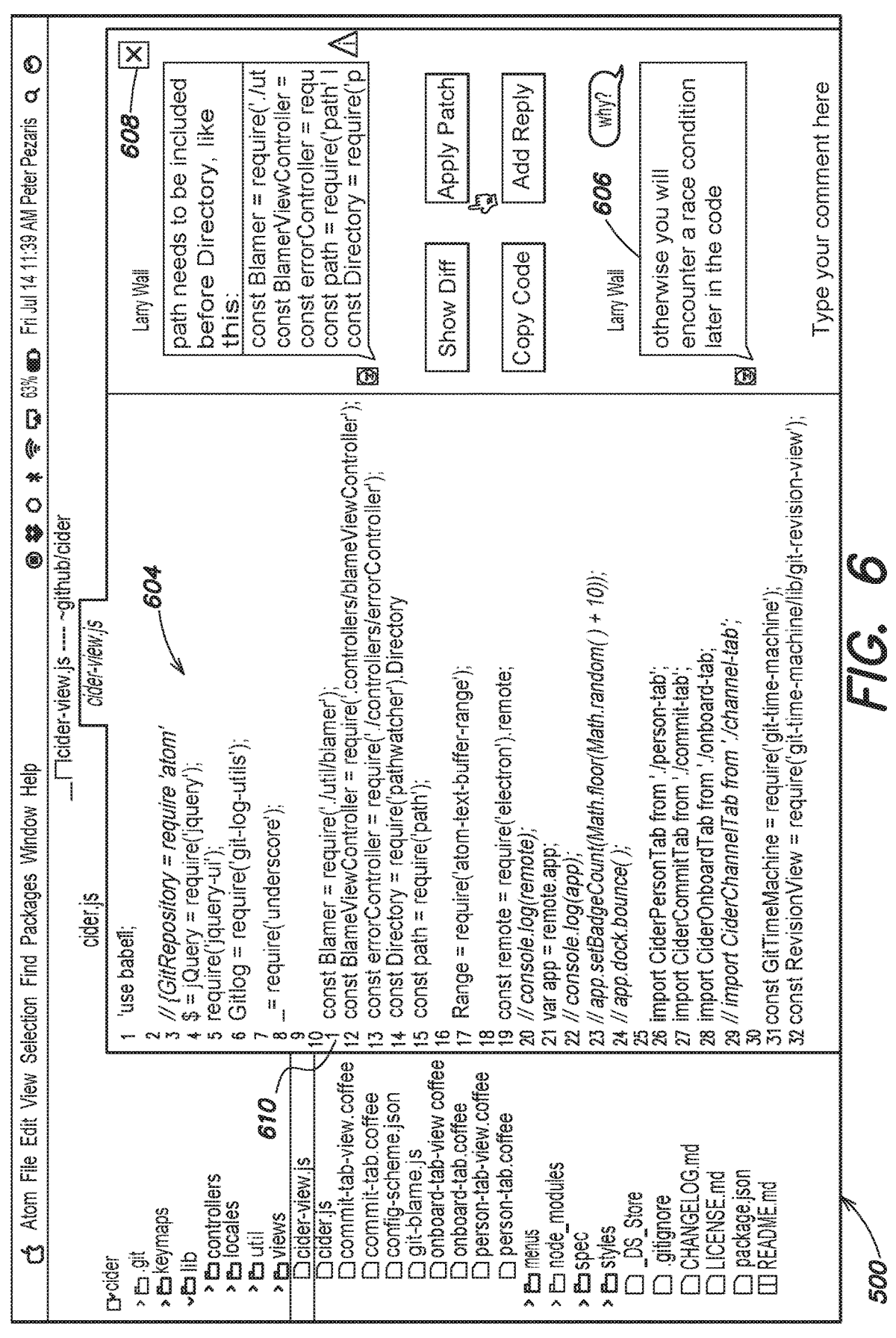

FIG. 6 shows an example message stream associated with a code change and messaging back and forth between the requestor and the code author or responsible user. The message stream can be displayed in a communication panel (e.g., at 606). According to some embodiments, selection of the a code change message transitions the system to a focused code review message stream (e.g., in 606). By selecting 608 the system is configured to transition back to a general file or directory message stream (e.g., like in FIG. 4 at 406). In further embodiments, code specific message streams are stored for subsequent access. For example, annotations are displayed in conjunction with code line numbers in editing panel 604 at 610. The annotation visual elements are configured to display in all visualizations of the code. The annotation indicator is configured to transition the system to code specific message stream views that enable the user to review, for example, proposed code changes, messaging between the developers, etc.

Figure 7A:
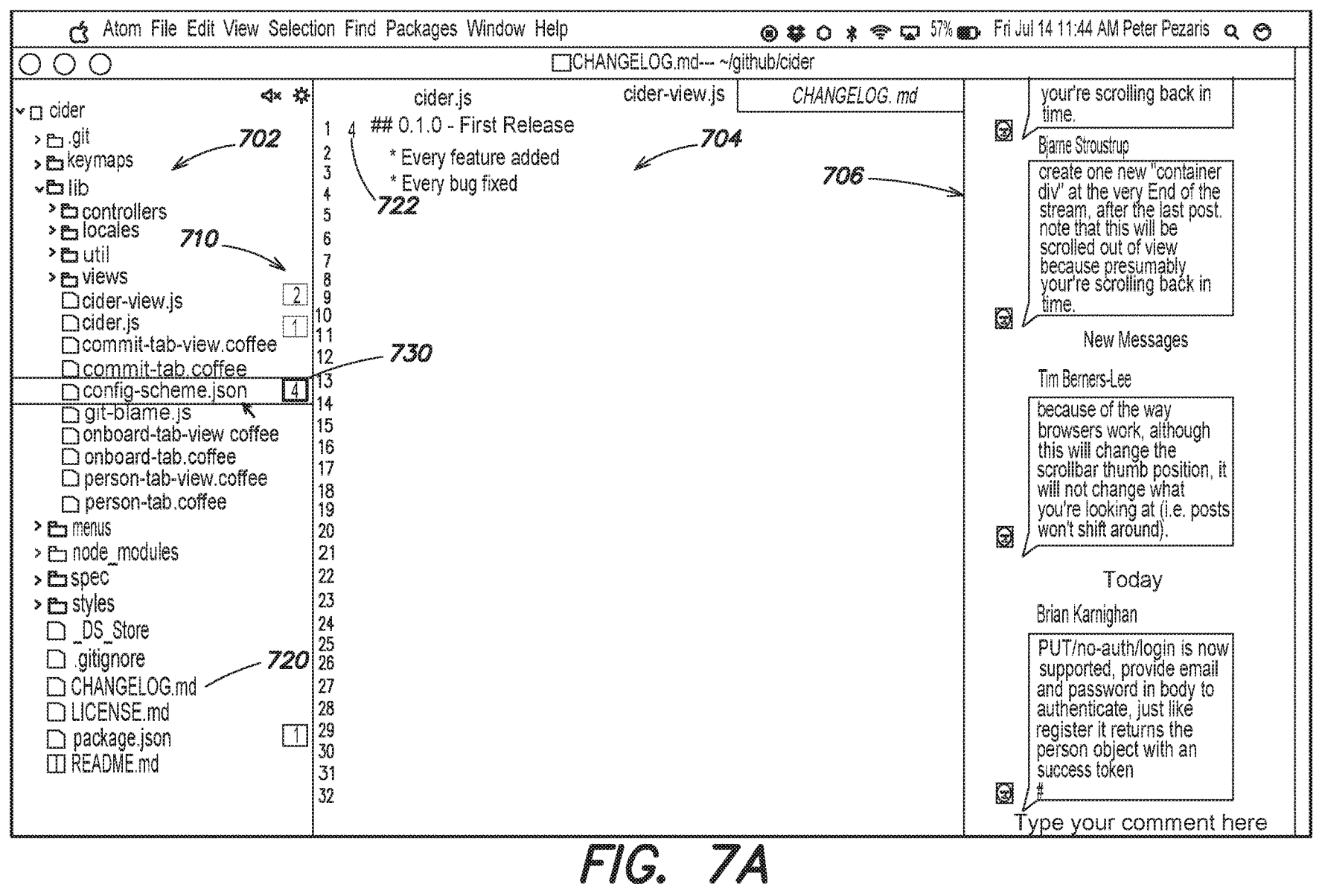
Figure 7B:
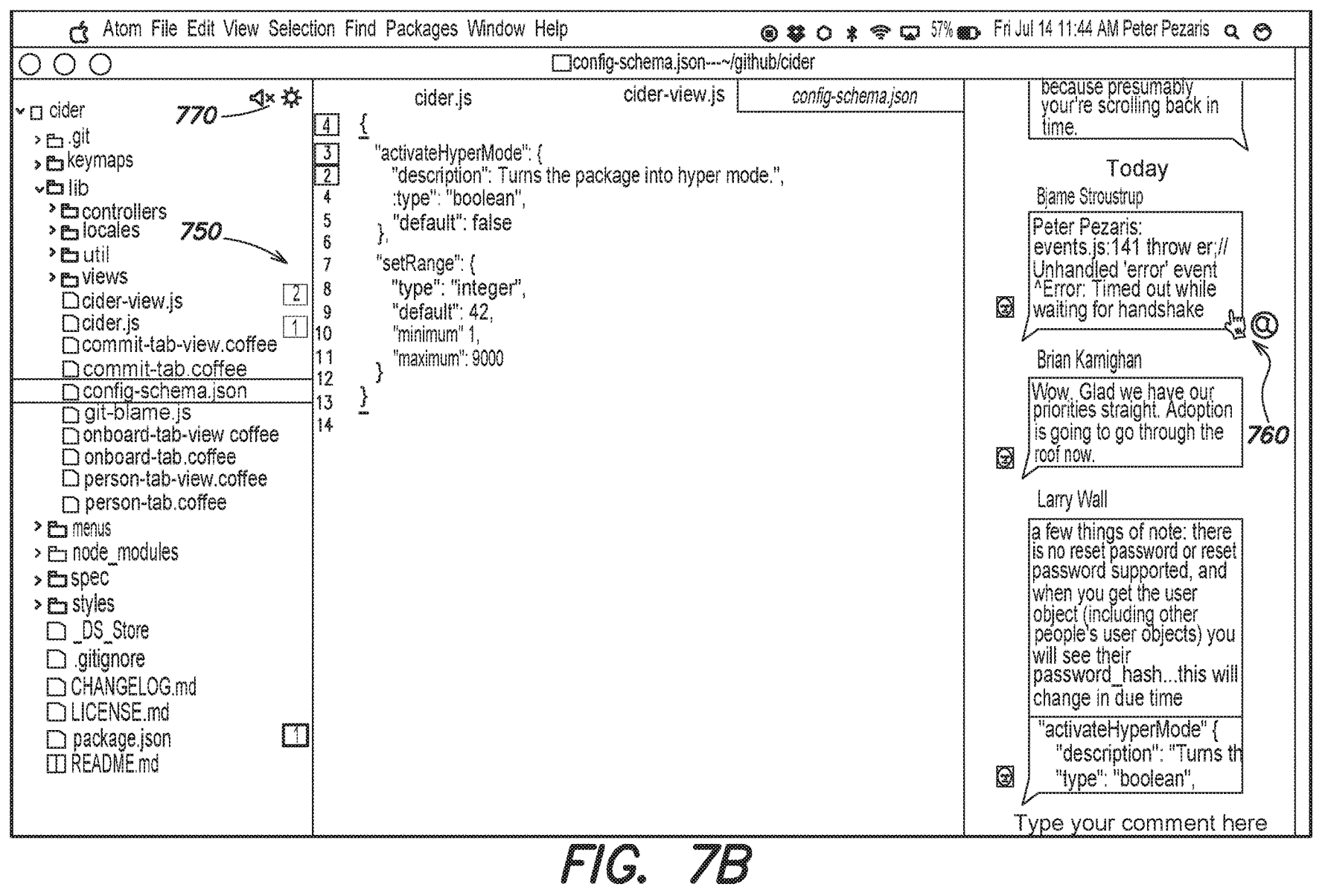

FIG. 7A is an example screen capture of a UI showing unread message notification. In the space to the right of the code tree listing (e.g., 702), at column 710 a count of any unread messages associated with each file in the code tree is displayed. The system maintains information on new message and a read status. In some embodiments, the system is configured to display an unread message notification with a count of the unread messages included in the display. The notification is presented in association with the file and/or code to which the message pertains. In some embodiments, users are given fie grain control over the appearance of these notifications, being able to turn notifications off per file, across a directory, or for the entire code tree. FIG. 7A also illustrates a transition from the message stream view in FIG. 6 to the message stream view of FIG. 7A, responsive to selection of CHANELOG.md at 720. The transition includes a transition in the editing panel 704 to show the code associated with the CHANELOG.md file, and the communication panel 706 reflects messages associated with the CHANELOG.md file. AT 730 additional unread message notifications are displayed. Unread notification displays can be configured to highlight messages that are directed to a current users. For example, 730 can be displayed in read to bring the user's attention to the unread message notification that includes messages directed to the current user. Selecting 730 in the UI (e.g., clicking with a mouse and pointer) transitions the system the example UI shown in FIG. 7B.

Once the user views the messages, the unread message indicator is no longer displayed in column 750. According to some embodiments, within a message stream additional displays can be displayed to draw the user's focus to their messages. For example, at 760 an "@" indicator can be display in a highly visible color (e.g., red) to bring attention to a specific message. As discussed above, the system provides fine grain control over notification massages. For example, right clicking on a file in the code tree provides a menu option to mute notification messages. Additional options in the menu can include "bold" and "badge" which are configured to allow a user to tailor message reporting information/visualization on the system. According to one embodiment, a system default is configured to display a numerical indicator showing # of new messages to the file (for example, that number of messages can be referred to as a "Badge"—e.g. on an iPhone, the red number that appears over the messages icon in the UI shows the user how many unread messages the user has across all of the user's conversations). For example, if a user wants to know that there are new messages, but does not need the additional information on how many, the user can select "Bold" from the menu. Responsive to selection of bold the system is configured to limit UI displays of unread messages to a visual indication without the number of unread messages. In one use case, the user can select this options in the UI when the user wants to know that there is conversation, but does not want to be overwhelmed by 872 unread messages. According to another embodiment, a mute all (e.g., 770) option is available to turn off the displays associated with the communication streams for all the files in the code tree.

Figure 8A:
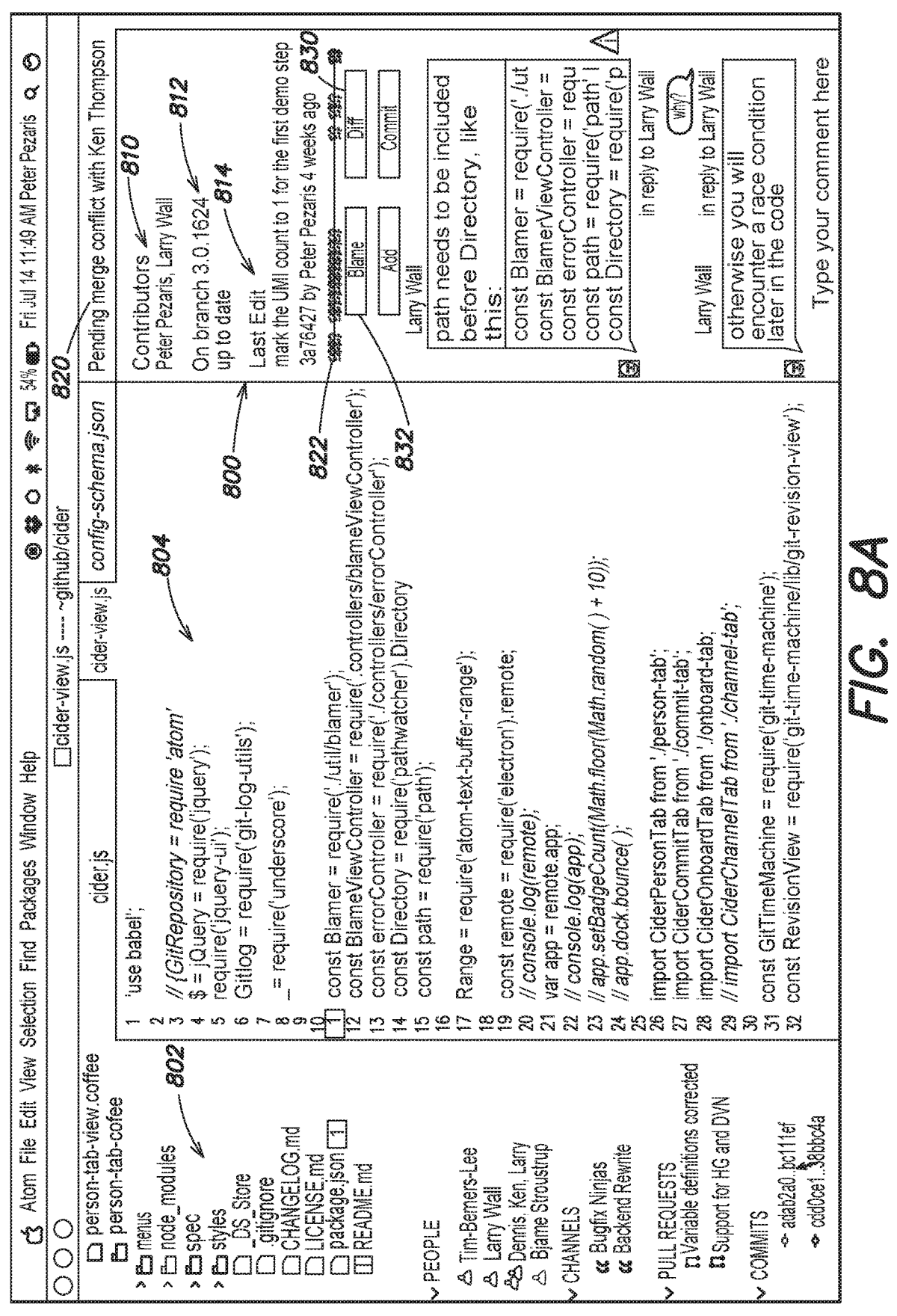
Figure 8B:
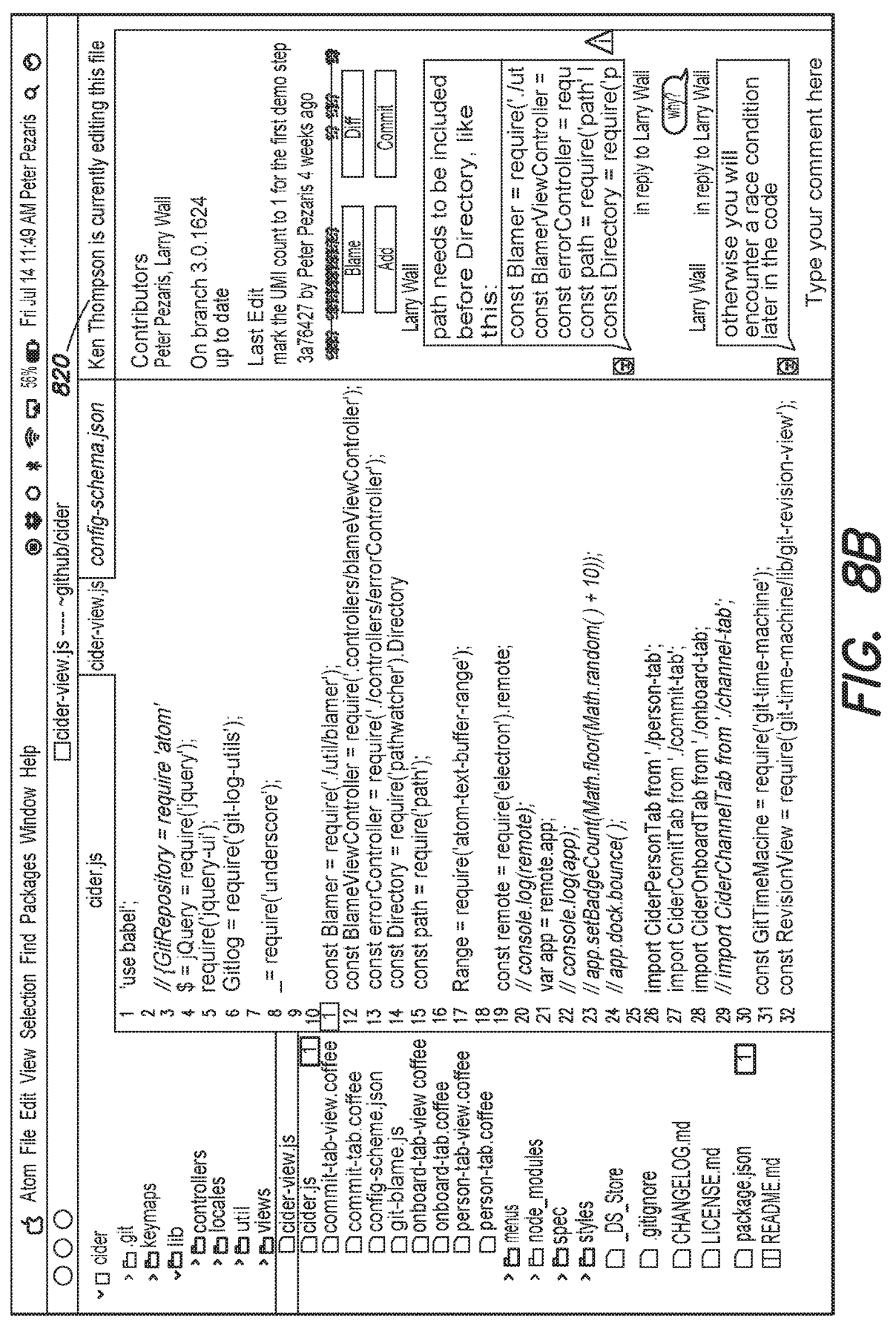

FIG. 8 shows another example UI according to one embodiment that exposed version control system ("VCS") information captured from a version control system (e.g., GIT) integrated with the user's IDE. A VCS panel 800 can be displayed on the right side of the screen above a message stream associated with a file in the code tree shown at 802. The VCS panel 800 is configured to display information captured by the system, that would normally require a transition to a version control system external to the IDE and associated operations (e.g., GIT blame or history). The VCS information enables a comprehensive view of the code and version control information to improve over convention commit processing in IDEs. The additional information exposed includes: contributors at 810, branch information at 812, and last edit information at 814. In some embodiments, an edit history timeline can be displayed (e.g., 822) that is configured to display associated edits responsive to selection in the timer (e.g., mouse click). The real time nature of the communication channel provide by the plug-in and/or IDE communication system enable further functionality akin to enhanced presence for software developers. For example, a real time status window can display actions underway by other developers.

According to one embodiment, display 820 includes real time status notification that can covey that another user is currently editing a file (e.g., FIG. 8B 820) that the current user is working on committing their changes to. Further embodiments provide real time notification of potential merge conflicts, where another user has begun editing the same code or code lines being reviewing for a commit (e.g., at 820—"Pending merge conflict with Ken Thompson"). Some embodiments of the system maintain change status information on lines of code and compare editing being executed by other users in real time. Merge conflicts are identified by the system when other users edit the same code lines from prior versions of the code, that another users has also edited. Providing notifications on merge conflicts as they occurring represents a significant advance over other approaches.

Figure 9:
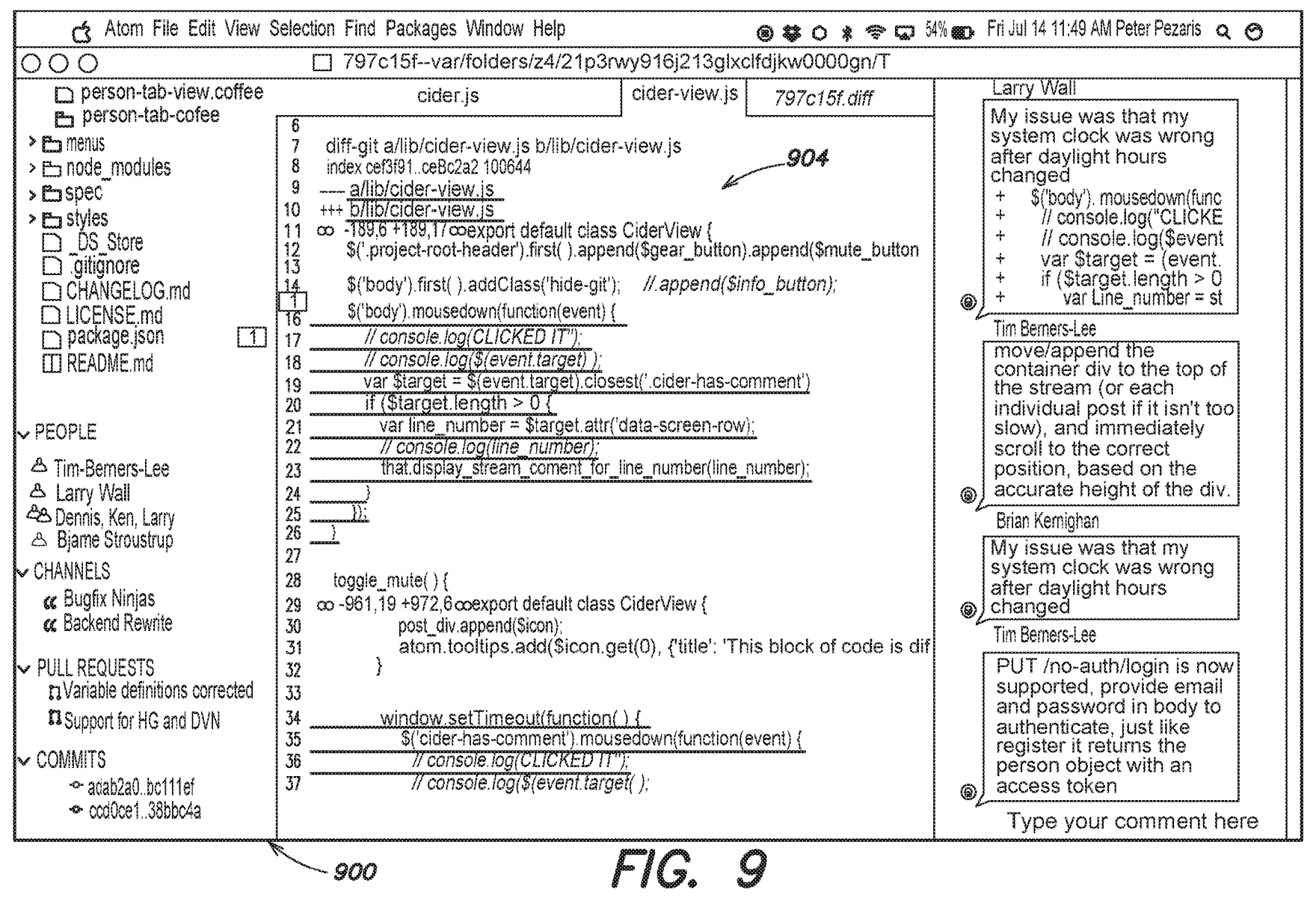

Selection in the VCS panel 800 of "Diff" at 830 transition the system to a difference view of the code in editing panel 804. FIG. 9 is a screen capture of an example UI 900 showing a difference view of the code at 904. Selection of Blame 832 FIG. 8A transitions to a view of attribution information for edits. Each of the function provides additional capability to improve the user's capability and understanding during code commits. Moreover, the communication panel available in each of the views, facilitates real time resolution of questions and/or problems associated with specific code. Those messages then become readily accessible context for later review of the same code. Each of the functions described with respect to the UI captures is enabled by an underlying IDE communication system or plugin. Various embodiment are provided as plugin extensions that integrate and leverage functionality provided by an existing IDE application. Some embodiments include IDE applications architected with the communication interface and tracking functions built in without the need for extensions or plugins.

Shown in FIG. 10 is a block diagram of an IDE communication system 1000. According some embodiments, the IDE communication system can comprise an IDE application with communication functions built in or can comprise a plugin or extension for existing IDE applications. The system 1000 is configured manage communications between a user base accessing a development environment. According to one embodiment, the system manages communication while maintain associations to source code identified in the development environment. In one example, the system enables users to select lines of code on which to build a message. The system records the associations to the lines of code and the composed message, and enables a message stream between the user base tied to the lines of code. The specific message stream can also be linked to the source code file, and be accessed in a higher level view of the message streams associated with the source code file. The system further enables transitions between the focused view associated with the specific lines of code and views of the file and associated larger message streams.

According to various embodiments, the system is configured to manage messaging functions and saved links between messages and subsets of source code. Further, system enables chat sessions (e.g., instant messaging) to take place around a specific location or block of code and permanently creates an association between source code and the conversations between users about it. According to some embodiments, the record of the conversations can be specific and include, for example, which version/branch of the file/function/block it refers to. The system and associated UIs can be configured to display message stream associated with a specific version/branch of the file/function/block and can also allow access and/or display to message streams for all version/branches of the file/function/block or code. For example, the older versions and associated messages can display in chronological order. In other examples, options to navigate to other versions or branches can be displayed in the UI.

According to various embodiments, the system is configured to include indicators within displays of source code of extant conversations. In some examples, the displays include annotation indicators displayed in conjunction with code line number displays. In other embodiments, the system can be configured to provide displays for Unread Message Indicators associated with source files, for example, shown in a code tree. The system can also be configured to display different visual indicators for pending patches, at-mentions, commits, etc., in the user interface. Selection in the UI can trigger the system to transition to the respective code/source file/etc. to review along with any associated message streams. In some embodiments, the system is configured to generate and display a history slider inside any IDE, where the history slider is configured to transition through a message stream associated with some code or function. The user can transition through chronological message based on manipulating the history slider in the UI.

Integration into the development environment (for example using a development environment engine 1002) provides a number of functions that extend traditional implementations. In some embodiments, the system is configured to automatically generation addressee information and pre-fill address information in a message responsive to selection of code in the UI (e.g., with engine 1002). For example, the system can be configure to pull email addresses from any code repository, and automatically populate the addressee in the message responsive to selection of code line(s) or code portions. In one example engine 1002 can be configured to search code or code repositories (e.g., even external code repositories) for associated e-mail address for authors or code administrators and return that information to the system for automatic messaging.

The system can also be configured to augment code review processes for development. For example, the system is configured to improve formal code review, based on the message streams and archives of issues, resolutions, proposed changes, and commit operations. In some embodiments, the system includes a tracking engine 1006 configured to associated code, code lines, code segments, etc. to message streams about them. In this manner, the system uses the messages streams and presentation to subsequent users to implement code review as an organic by-product of strong communication within and about the code. In other examples, use of the communication system enhancements can reduce and eliminate the need for formal code reviews while preserving compliance with formal code review protocol. In other words, the tracking of issue and resolution and/or code changes over time, provides the needed information for a formal code review process. According to one embodiment, review of each message by subsequent users can be tracked on the system and used to clear formal code review requirements.

According to another embodiment, the system can include a communication engine 1004 specially configured to manage enhanced communication functionality. Although in other embodiments the system can be configured with the same functionality without a specialized engine. The communication engine is configured to enable instant messaging and/or chat between the users of the development environment. For example, the communication engine provides direct messaging embedded into any IDE. Further embodiments, enable channel messaging, where members are added to a topic specific channel by a channel creator or users can add themselves, or request additional to specific communication channels For example, a "bugfix" channel can be used to post bug information, and serve as a topic specific message stream that exists apart for the code based message streams. According to various embodiments, both message streams can be tied to specific code and both message streams can be used to access various messages, but the channel specific stream provides a topic organization (e.g., all bugs, backend rewrite channel (e.g., fixes specific to bank end issues), etc.) as opposed to code line/file/function associations of other message streams.

In further embodiment, the communication engine 1004 can operate in conjunction with an interface engine 1008 to provide contextual indicator in a user interface regarding pending communication or unread messages. The interface engine can generate specific visualization to identify messages to a current user or provide general notification to messages within a message stream or channel. Further the interface engine and/or the communication engine can be configured to provide real-time notification of file modifications and can detect and display real-time events to the user base.

According to some embodiments, the interface engine 1008 can also receive information from a tracking engine 1008. In one example, the tracking engine can be configured to maintain info ration on code changes across all users. The tracking engine can be configured to detect merge conflicts that result from multiple users altering the same code. For example, based on merge conflict information the interaction engine can be configured to display real-time notification of pending merge conflicts and prevent the conflict from being committed by the respective parties. The tracking engine 1006 is configured to detect real-time conflict between two or more developers and trigger notification messages to the respective users.

Further enhancements over conventional IDE approaches include a one-click patch user interface configured to enable code patches produced by other developers to be automatically applied based on review of the code by the original code author or code administrator. Additionally, the system and/or communication engine 1004 is configured to enable messaging and message stream tracking across multiple development environments. For example, a first user operating a first IDE application and a second user operating a second IDE application can both develop the same code base through their respective environments, and are both given access to messages streams sent to users in either environment or between users operating in different environments. According to various embodiments, the system and/or communication engine 1004 can operate as a common interface between any number of different IDE applications, allow any number of users to select between and number of development platforms, while still enabling the common communication channel and tracking functions that eliminate many of the issues with conventional IDE applications.

For example, the system is configured to add a real-time conversation stream to any type of document (e.g., a document can be a source code file, a "word doe", a spreadsheet, etc.) and for example, enable any one or more of: track any communications, annotate the document (e.g., source code file) to enable access to prior messages, auto-direct new messages, notify users of user directed message, maintain unread indicators within the document, among other options.

In further embodiments, the communication streams tracked by the system are linked to code line and/or function descriptions (e.g., the system is configure to recognize that selected code lines in the UI are part of a given function (e.g., system is configured to search preceding or post lines for method calls, class definitions, start functions characters, etc.). That information is linked to the given messages and/or messages streams by the system automatically, so the associations and/or functions can be searched directly to retrieve the associated messages within particular code repository.

In further embodiments, the system manages message stream so that responsive to selection in the user interface the system is configured to jump to points in a conversation stream based on commit. In one example, commit operations are tracked by the tracking engine 1006, and are accessible based on a commit operation, code line, etc. In further embodiment, the system and/or tracking engine stores information on commit history to enable automatic generation of review teams. For example, the system is configured to automatically determine a review team based on commit history queried from a VCS application or service. Further the system can build a review team from any users who had engaged in message streams associated with code commits on specific files, functions, code lines, etc. In one example, the system auto-assembles teams based on VCS commit history, where the team is defined by member of matching discussion groups. The system is also configured to facilitate code review inside the IDE, further facilitating code review operations.

As discussed above, various embodiments of the communication system can include a variety of engines configured to perform specific tasks within the system, however, various embodiments are configured to perform the same or similar functions without need of instantiating the respective components discussed above.

Figure 11:
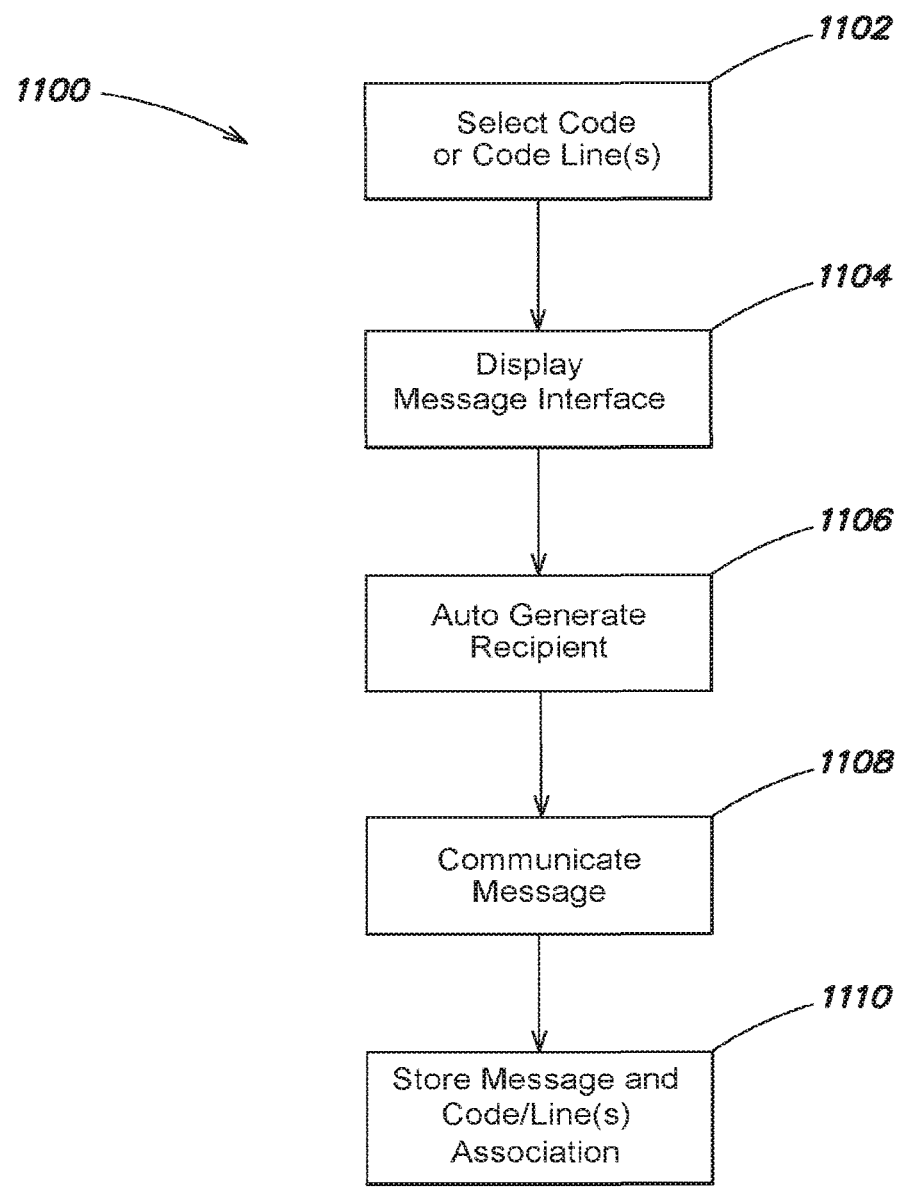
FIG. 11 is an example process flow for building code associated message streams, according to one embodiment.

FIG. 11 is an example process flow 1100 for building code associated message streams. According to one embodiment, process 1100 begins with selection of one or more code lines in a user interface at 1102 In other examples, the process can begin with selection of any document or portion of a document in an editing panel of an IDE. Responsive to selection of the code lines, a message interface can be displayed at 1104. In some embodiments, the selected code lines and/or associated code file can be used to identify an author of the code, a last editor of the code, or a responsible party (e.g., code administrator) for the selected code at 1106. The identified user is then displayed in the messaging interface as an auto-generated recipient of a message about the selected code. Once any message text is received, the process 1100 continues at 1108 with communication to the message to the specified recipients. In some embodiments, messages are communicated to users on other IDE applications, and can optionally be indicated to other users via unread message notifications. At 1110, the message is stored with associations to any one or more of the selected code, code lines, code functions, or code file. Subsequent access to the same code file will display any messages streams associated with the code file. Selection within the message stream can be trigger a transition by the system to a view of code specific message stream. In another example, selection of code in the editing panel can transition a communication panel to a code specific view of a message stream.

Process 1100 is illustrated as an example process flow. In other embodiments, the various steps illustrated can be executed together, or ones of the various steps can be omitted or executed as part of other processes.

The various functions, processes, and/or pseudo code described herein can be configured to be executed on the systems shown by way of example in FIG. 10. The systems and/or system components shown can be specially configured to execute the processes and/or functions described. Various aspects and functions described herein, in accord with aspects of the present invention, may be implemented as specially configured hardware, software, or a combination of hardware and software on one or more specially configured computer systems. Additionally, aspects in accord with the present invention may be located on a single specially configured computer system or may be distributed among one or more specially configured computer systems connected to one or more communication networks.

For example, various aspects, components, and functions (e.g., auto-generate recipient, link messages and code lines, automatically build channel and/or team, code review functions, generate unread message notification, navigate to code specific message streams, etc.) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 12:
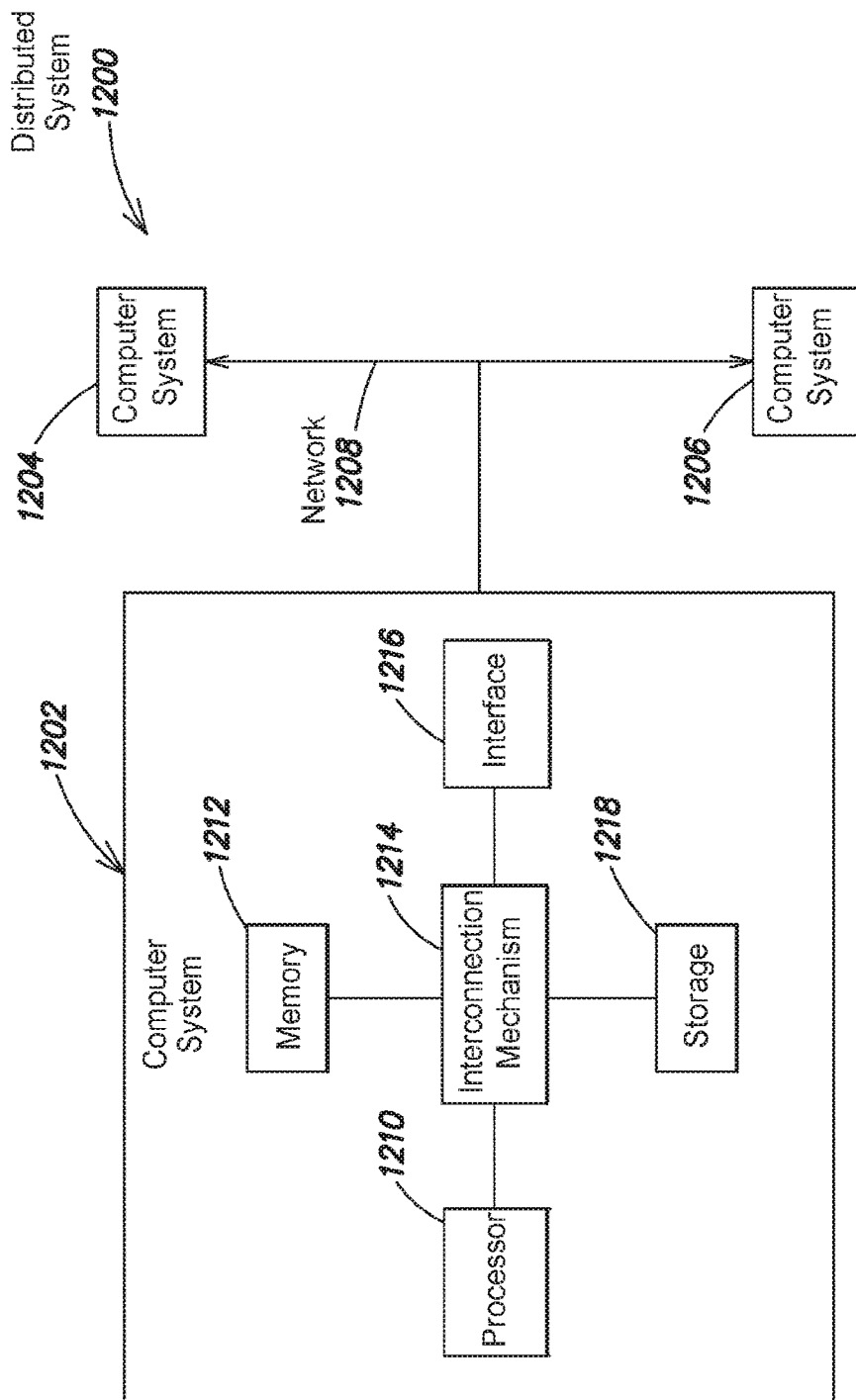
FIG. 12 is a block diagram of a special purpose computer system, according to one embodiment.

Referring to FIG. 12, there is illustrated a block diagram of a distributed special purpose computer system 1200, in which various aspects and functions are practiced (e.g., including a replication component (e.g., captures executed write operations and distributes to nodes hosting the same copy of data), a configuration component (e.g., enables arbiter participation in either or both data commitment and primary election), an election component (e.g., triggers election protocols in response to primary failure), among other options). As shown, the distributed computer system 1200 includes one more special purpose computer systems that exchange information. More specifically, the distributed computer system 1200 includes computer systems 1202, 1204 and 1206. As shown, the computer systems 1202, 1204 and 1206 are interconnected by, and may exchange data through, a communication network 1208. For example, a segment of a distributed database can be implemented on 1202, which can communicate with other systems (e.g., 1204 and 1206), which host other or remaining portions of the system, message data, and/or copies of the linked message data.

In some embodiments, the network 1208 may include any communication network through which computer systems may exchange data. To exchange data using the network 1208, the computer systems 1202, 1204 and 1206 and the network 1208 may use various methods, protocols and standards, including, among others, TCP/IP, or other communication standard, and may include secure communication protocols VPN, IPsec, etc. To ensure data transfer is secure, the computer systems 1202, 1204 and 1206 may transmit data via the network 1208 using a variety of security measures including, for example, TLS. SSL or VPN or other standard. While the distributed computer system 1200 illustrates three networked computer systems, the distributed computer system 1200 is not so limited and may include any number of computer systems and computing devices, networked using any medium and communication protocol.

As illustrated in FIG. 12, the special purpose computer system 1202 includes a processor 1210, a memory 1212, a bus 1214, an interface 1216 and data storage 1218 and further includes any one or more of the component discussed above to implement at least some of the aspects, functions and processes disclosed herein, as either a stand-alone system or part of a distributed system. In some embodiments, the processor 1210 performs a series of instructions that result in manipulated data. The processor 1210 may be any type of processor, multiprocessor or controller. The processor 1210 is connected to other system components, including one or more memory devices 1212, by the bus 1214.

The memory 1212 stores programs and data during operation of the computer system 1202. Thus, the memory 1212 may be a relatively high performance, volatile, random access memory such as a dynamic random access memory (DRAM) or static memory (SRAM) or other standard. However, the memory 1212 may include any device for storing data, such as a disk drive, hard drive, or other non-volatile storage device. Various examples may organize the memory 1212 into particularized and, in some cases, unique structures to perform the functions disclosed herein. These data structures may be sized and organized to store values for particular to specific database architectures and specific data types, and in particular, may include standardize formats for organizing and managing data storage.

Components of the computer system 1202 are coupled by an interconnection element such as the bus 1214. The bus 1214 may include one or more physical busses, for example, busses between components that are integrated within the same machine, but may include any communication coupling between system elements including specialized or standard computing bus technologies such as IDE, SCSI, PCI and InfiniBand or other standard. The bus 1214 enables communications, such as data and instructions, to be exchanged between system components of the computer system 1202.

The computer system 1202 also includes one or more interface devices 1216 such as input devices, output devices and combination input/output devices. Interface devices may receive input or provide output. More particularly, output devices may render information for external presentation. Input devices may accept information from external sources. Examples of interface devices include keyboards, mouse devices, microphones, touch screens, printing devices, display screens, speakers, network interface cards, etc. Interface devices allow the computer system 1202 to exchange information and to communicate with external entities, such as users, vendors, and other systems.

The data storage 1218 includes a computer readable and writeable nonvolatile, or non-transitory, data storage medium in which instructions are stored that define a program or other object that is executed by the processor 1210. The data storage 1218 also may include information that is recorded, on or in, the medium, and that is processed by the processor 1210 during execution of the program. More specifically, the information may be stored in one or more data structures specifically configured to conserve storage space or increase data exchange performance.

The instructions stored in the data storage may be persistently stored as encoded signals, and the instructions may cause the processor 1210 to perform any of the functions described herein. The medium may be, for example, optical disk, magnetic disk or flash memory, among other options. In operation, the processor 1210 or some other controller causes data to be read from the nonvolatile recording medium into another memory, such as the memory 1212, that allows for faster access to the information by the processor 1210 than does the storage medium included in the data storage 1218. The memory may be located in the data storage 1218 or in the memory 1212, however, the processor 1210 manipulates the data within the memory, and then copies the data to the storage medium associated with the data storage 1218 after processing is completed. A variety of components may manage data movement between the storage medium and other memory elements and examples are not limited to particular data management components. Further, examples are not limited to a particular memory system or data storage system.

Although the computer system 1202 is shown by way of example as one type of computer system upon which various aspects and functions may be practiced, aspects and functions are not limited to being implemented on the computer system 1202 as shown in FIG. 12. Various aspects and functions may be practiced on one or more specially configured computers having different architectures or components than that shown in FIG. 12 which can be modified to include the specially purpose components and/or functions discussed. For instance, the computer system 1202 may include specially programmed, special-purpose hardware, such as an application-specific integrated circuit (ASIC) tailored to perform any one or more operations disclosed herein (e.g., validating received operations, routing write operations, replicating operations, among other examples). While another example may perform the same function(s) using a grid of several computing devices running MAC OS System X with Motorola PowerPC processors and several specialized computing devices running proprietary hardware and operating systems.

The computer system 1202 may be a computer system including an operating system that manages at least a portion of the hardware elements included in the computer system 1202. Additionally, various aspects and functions may be implemented in a non-programmed environment, for example, documents created in HTML, XML or other format that, when viewed in a window of a browser program, can render aspects of a graphical-user interface or perform other functions.

Figure 13:
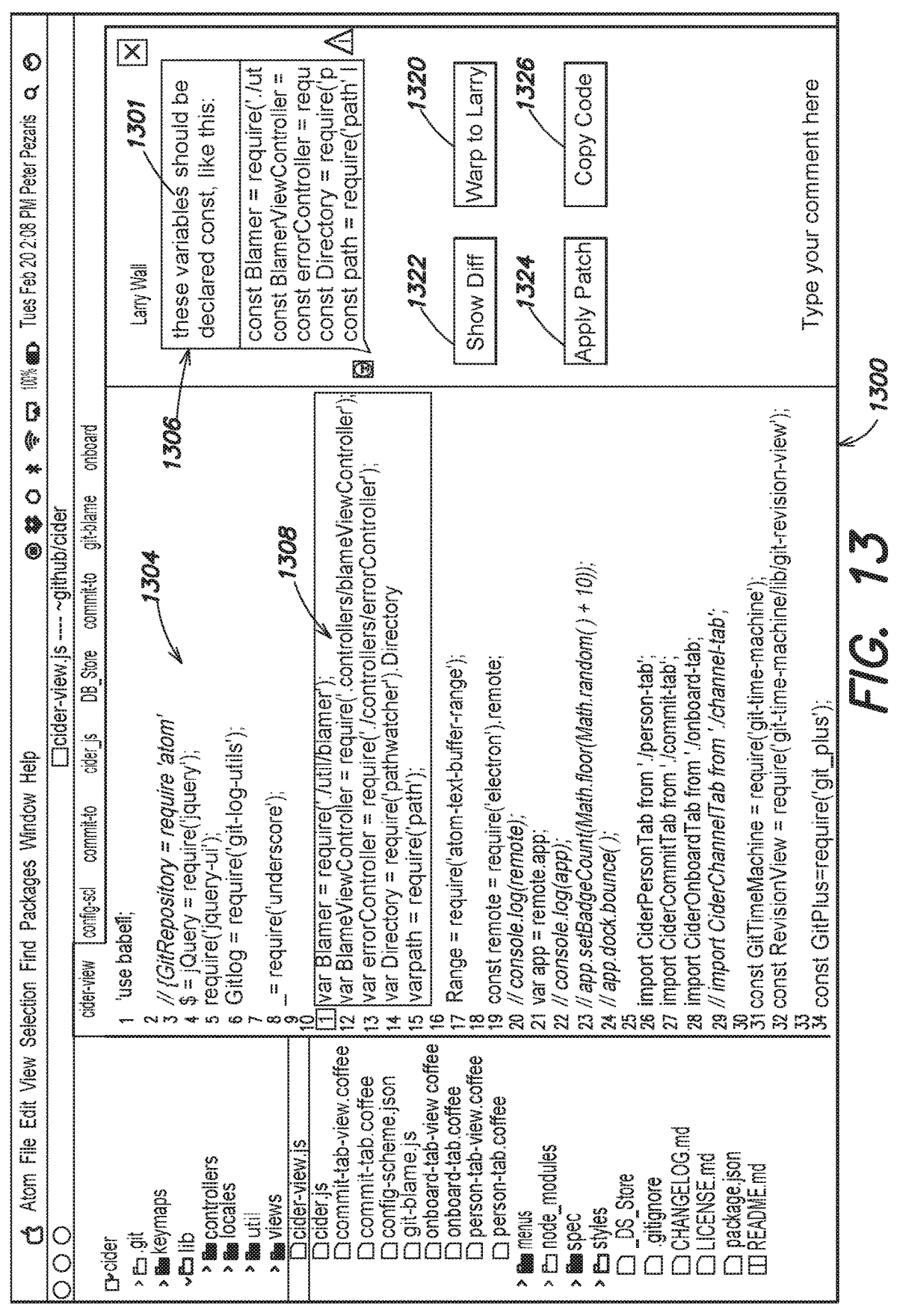

FIG. 13 illustrates an example UI 1300 showing a view of message 1301 selected in the UI displayed in a communication panel 1306 with a respective message stream, and focusing on the unmodified, original code 1308 in an editing panel 1304. According to some embodiments, the system executing the UI, or the system in communication with another system executing the UI, identifies a recipient of the message 1301 in the message stream and annotates in the message stream the recipient with respect to the message 1301 (e.g., the system identifies and annotates "Larry Wall" as the author of the message 1301). According to some embodiments, the system distinguishes between a target user for the message 1301 and another user mentioned in the message 1301 and selects the target user as the recipient of the message 1301. For example, if another user is mentioned in the body of the message 1301, that user is not selected as the recipient of the message 1301. Instead the recipient selected or targeted by user "Larry Wall" is selected as the recipient of the message 1301. According to some embodiments, the system determines whether the message 1301 relates to a special codeblock (e.g., an altered codeblock, an orphaned codeblock, etc.). If the message 1301 is determined to relate to a special codeblock, the system is configured to visually distinguish the message 1301 in the communication panel 1306 to indicate this relationship to the user.

According to some embodiments, if the system receives a modification of the original code 1308 in the editing panel 1304 (e.g., additional code added, deleted, renumbered, moved), the system stores metadata for preserving communication thread linkage between the modified code and the respective message stream associated with the original code 1308. The modification may be received in the message 1301 or a user of the system may directly enter the modification into editing panel 1304. According to some embodiments, the system stores, in metadata relating to the original code 1308, a commit identification of the code in the editing panel 1304 and/or a commit identification of the modified code (e.g., when the modified code is included in a code repository, e.g., git repository). For example, the system may store the commit identification to help keep track of changes to the original code 1308 across different versions of the code stored in a code repository.

According to some embodiments, the system determines whether the modification comprises deletion of a portion or all of the original code 1308 in the editing panel 1304. In response to determining that the modification comprises such a deletion, the system is configured to visually indicate, in the editing panel 1304, a portion of the editing panel 1304 corresponding to the deleted code. For example, such a visual indication may assist the user in identifying that code has been deleted and/or identifying code that came before and after the deleted code. Additionally or alternatively, the system may store, in metadata relating to the original code 1308, one or more messages in the message stream, e.g., the message 1301, corresponding to the deleted code. For example, the system may store this information in the metadata to keep track of changes to the original code 1308 across different versions of the code stored in a code repository. Another user reading the messages stored in the metadata may be provided with appropriate context for the changes made across the different versions of the code.

According to some embodiments, the system dynamically monitors the message stream for presence of code. For example, the user may receive a message that includes code, e.g., the code in the message 1301. The system may detect the presence of code based on detecting one or more special characters, one or more variable names, or another suitable indicator of presence of code in the message. For example, the system may detect the presence of code based on detecting one or more leading spaces or one or more leading tabs at the beginning of a line in the received message. In response to detecting code in a message in the message stream, the system may determine whether there is any corresponding code in the editing panel 1304. For example, the system may determine that the code in the message 1301 corresponds to the original code 1308 in the editing panel 1304. The system may execute a heuristic-based search algorithm to identify the corresponding code, e.g., the original code 1308, based on the code detected in the message, e.g., the code in the message 1301.

According to some embodiments, the system is configured to provide one or more options for receiving updated or modified code, for example, through the message panel. For example, the system may be configured to provide an option to the user (e.g., original author, editing user, responsible editor, viewing user, etc.) to accept the code change proposed in the message (e.g., 1301). For example, the system can display a set of selection options within the messaging panel responsive to receiving modified code (e.g., via selection of "Apply Patch" at 1324). Other options may include a "Show Diff" function at 1322. According to one embodiment, the "Show Diff" function is configured to trigger the system to display a code difference view in editing panel 1304, between the current version of the code being viewed by a given user and the code as it would appear if the proposed modifications are executed. According to one example, the code difference view is configured to show changes to the code in markup language. In other examples, the system is configured to provide an option for a copy code function at 1326. Selecting 1326 may store the code from the message 1301 in temporary memory, e.g., a clipboard, for later retrieval by the user. The system may provide an option for a warp function at 1320. The warp function allows the user or message recipient to view the editing panel for another user, e.g., the sender of message 1301. For example, the sender of message 1301 may view his version of the code in his editing panel. The sender may make modifications to his version of the code. The sender may subsequently send message 1301 including proposed modifications that correspond to his modifications to the code. The user or message recipient receiving message 1301 may select 1320 to view the sender's editing panel and observe the sender's modified code. The user or message recipient may select the option to view the sender's editing panel because the user may desire to view the sender's modified code prior to applying the proposed modifications from message 1301 to his own version of the code. According to one embodiment, selecting 1320 may allow the user or message recipient to observe another user's editing panel and view the other user make modifications to his version of the code in real time. The user may optionally send a message to the other user with feedback on the modifications as the other user makes them. The other user may alter his modifications based on the feedback from the user. In this manner, the warp function may allow the two users to collaborate on the modifications to the code before they are finalized. According to one embodiment, selecting 1320 may allow the user or message recipient to compare his version of the code with the message sender's version of the code. For example, the user or message recipient may view his version of the code in one half of the display and the message sender's code in the other half of the display.

According to one embodiment, the user or message recipient does not modify the original code in his editing panel. The message sender modifies the original code in his editing panel to generate the sender's modified code. The message sender sends a message with proposed modifications corresponding to the sender's modified code. In this case, a function, such as "Show Diff," is configured to trigger the system to display a code difference view in the user's editing panel between the original code and a modified version of the original code with the proposed modifications executed. According to one embodiment, the "Show Diff" function is configured to determine a set of differences between the original code and the sender's modified code (and/or the proposed modifications) and execute the proposed modifications on the original code based on the set of differences. Other described functions may be similarly configured to compare the original code and a modified version of the original code with the proposed modifications executed.

According to one embodiment, the user or message recipient modifies the original code to generate the recipient's modified code. The message sender also modifies the original code in his editing panel to generate the sender's modified code. The message sender sends a message with proposed modifications corresponding to the sender's modified code. In this case, a function, such as "Show Diff," is configured to trigger the system to display a code difference view in the user's editing panel between the recipient's modified code and a version of the recipient's modified code with the proposed modifications executed. In order to correctly apply the proposed modifications, the system needs to accommodate for concurrency issues arising from both the message recipient and the message sender having modified the original code in their respective editing panels. According to one embodiment, the "Show Diff" function is configured to determine a first set of differences between the original code and the sender's modified code (and/or the proposed modifications), determine a second set of differences between the recipient's modified code and the first set of differences, and execute the proposed modifications on the recipient's modified code based on the second set of differences. For example, a variable may be assigned a value X in the original code, a value Y in the recipient's modified code, and a value Z in the sender's modified code. The system executing the "Show Diff" function may determine that the first set of differences includes an indication that the variable is assigned value X in the original code and is to be changed to value Z from the sender's modified code (and/or the proposed modifications). The system may then determine that the second set of differences includes an indication that the variable is assigned value Y in the recipient's modified code and is to be changed to value Z from the first set of differences. The system may then execute the proposed modifications on the recipient's modified code based on the second set of differences and change the assigned value of the variable from Y to Z. The system may then display a code difference view in the user's editing panel between the recipient's modified code and this version of the recipient's modified code with the proposed modifications executed.

Figure 17:
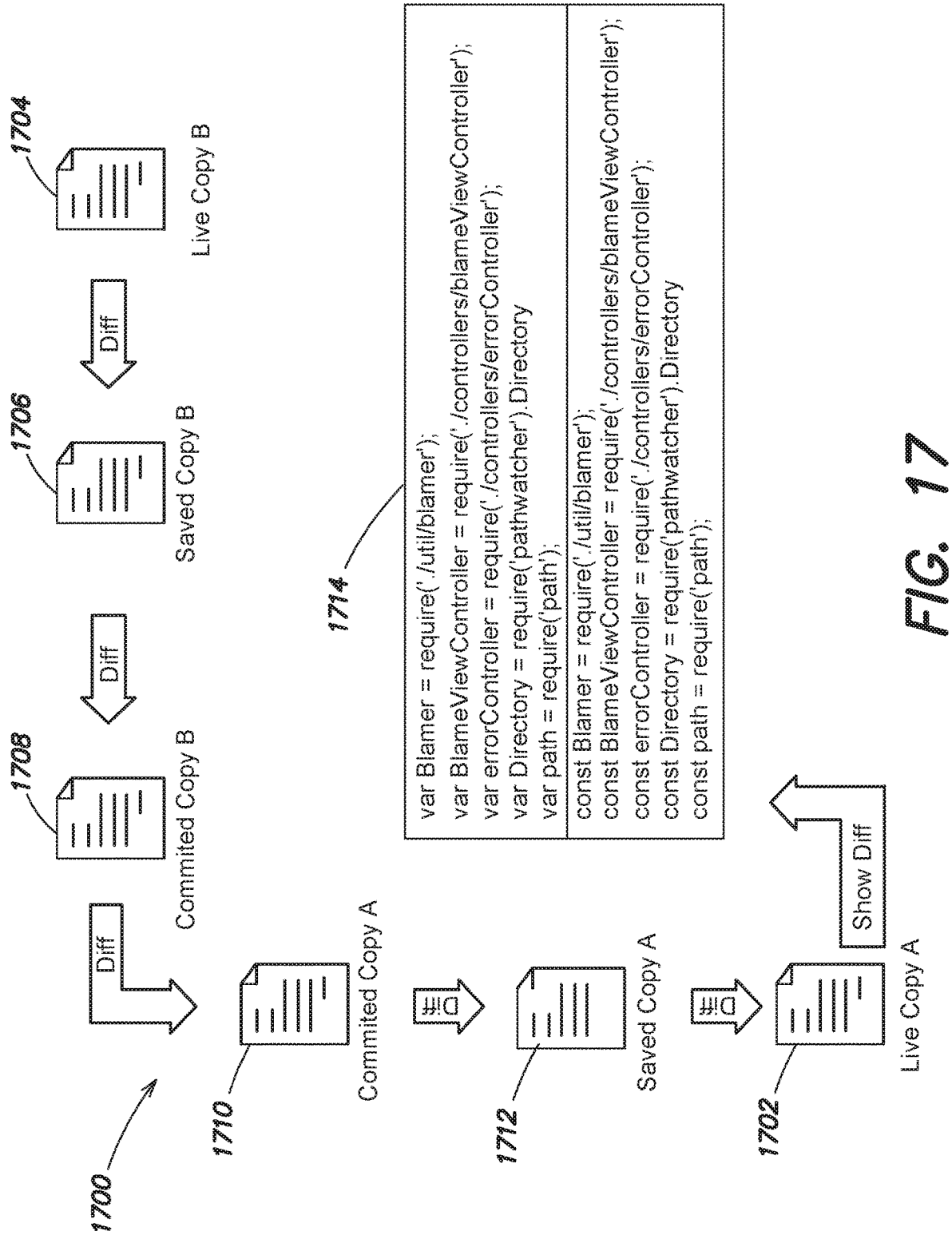
FIG. 17 is an example process flow for determining one or more differences between live copies of a codeblock from different users, according to one embodiment.

The systems and methods described are equally applicable to systems with more than two users. Concurrency issues between the message recipient's code and the message sender's code, such as those described above, may be magnified as the system is scaled to incorporate more than two users. Moreover, each user may be associated with multiple versions of code, including a version being edited in real time (or a live copy), a version saved locally (or a saved copy), and a version saved remotely (or a committed copy). The systems and methods described can accommodate a system with multiple users, each associated with multiple versions of the code. For example, the described systems and methods may scale up to thousands of users, each associated with one or more versions of the same code. FIG. 17 and the related description below describe an illustrative algorithm to address the case with two users, each associated with three versions of the code.

Figure 14:
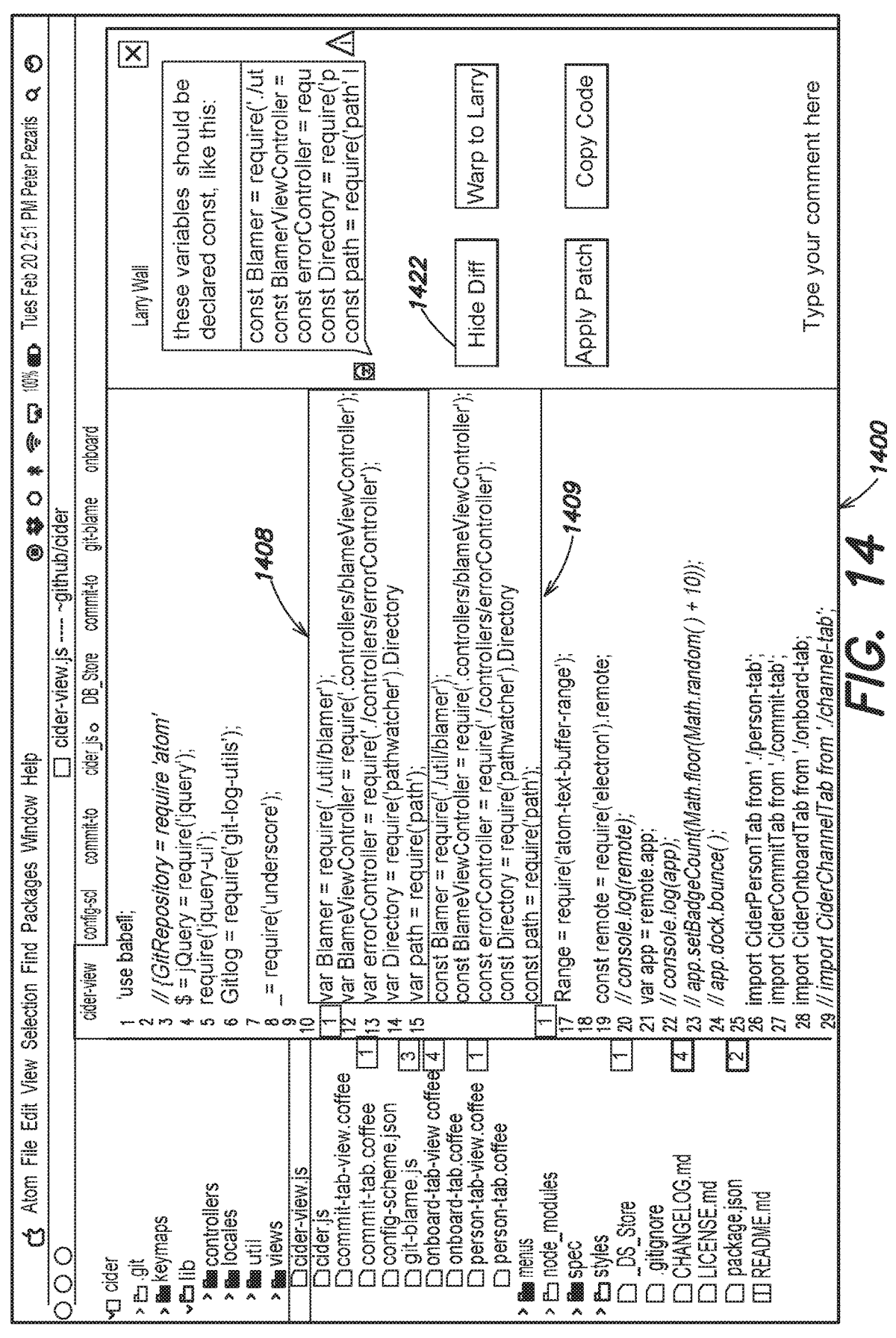

FIG. 14 illustrates an example UI 1400 showing the result of selecting the "Show Diff" function. The system displays a code difference view in the editing panel 1304 where code 1408 from the message recipient (corresponding to the original code 1308) and the sender's modified code 1409 from the message sender are shown. The code difference view may show changes to the code in markup language. The communication panel 1306 may include a function "Hide Diff" at 1422, which triggers the system to return to the code view in the editing panel 1304 as shown in FIG. 13. Additionally or alternatively, the user may select in the UI 1400 from an option for the function to apply patch 1324, an option for the function to copy code 1326, or an option for the function to warp 1320 to the editing panel for another user, e.g., the sender of the message 1301.

Figure 15:
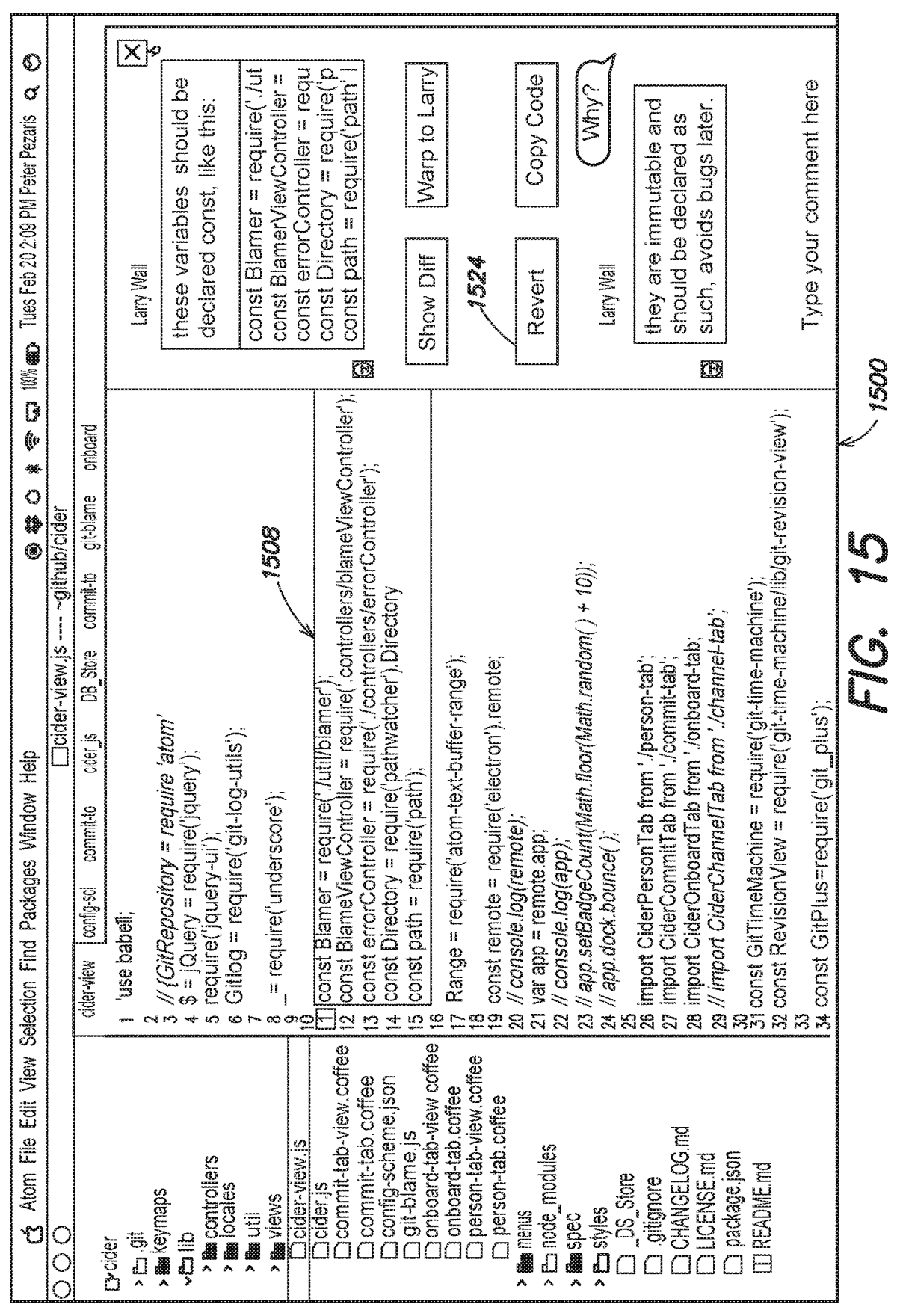

FIG. 15 illustrates an example UI 1500 showing the result of selecting the "Apply Patch" function. When option 1324 is selected, the system is configured to accept the proposed code change detailed in the message 1301 shown in the communication panel 1306 and generate a new visualization of the code being visualized by the current user or message recipient (e.g., the recipient's modified code 1508) with changes introduced. For example, the system may automatically determine that the original code 1308 corresponds to the proposed code change in the message 1301, receive identifying information for the original code 1308 from the sender of the message 1301, or receive manual identification of the original code 1308 from the user or recipient of the message 1301. Subsequent to identification of the corresponding code, the system may replace the original code 1308 with the code from the message 1301 to generate the recipient's modified code 1508. Alternatively, the system may identify the differences between the code 1301 and the proposed code change and replace the portions of code 1301 that differ from the proposed code change. Additionally or alternatively, the communication panel 1306 may include a function "Revert" 1524, which triggers the system to revert the code to the version prior to applying the proposed code change from the message 1301 in the communication panel 1306. e.g., the original code 1308.

In conjunction, post, or prior to applying the proposed code change to the original code 1308 in one of the manners described above, the system may save metadata corresponding to the original code 1308 where the system may include one or more indications of this version of the original code 1308. For example, the system may store changes made to the original code 1308 or the entirety of the original code 1308 in the metadata along with identifying information for retrieving it at a later time (e.g., time, date, code file, commit identification and/or other suitable identifying information). When the user selects option 1524 to revert the code prior to the proposed code change being applied to the original code 1308, the system may retrieve the necessary information from the metadata to replace the recipient's modified code 1508 with the original code 1308.

Figure 16:
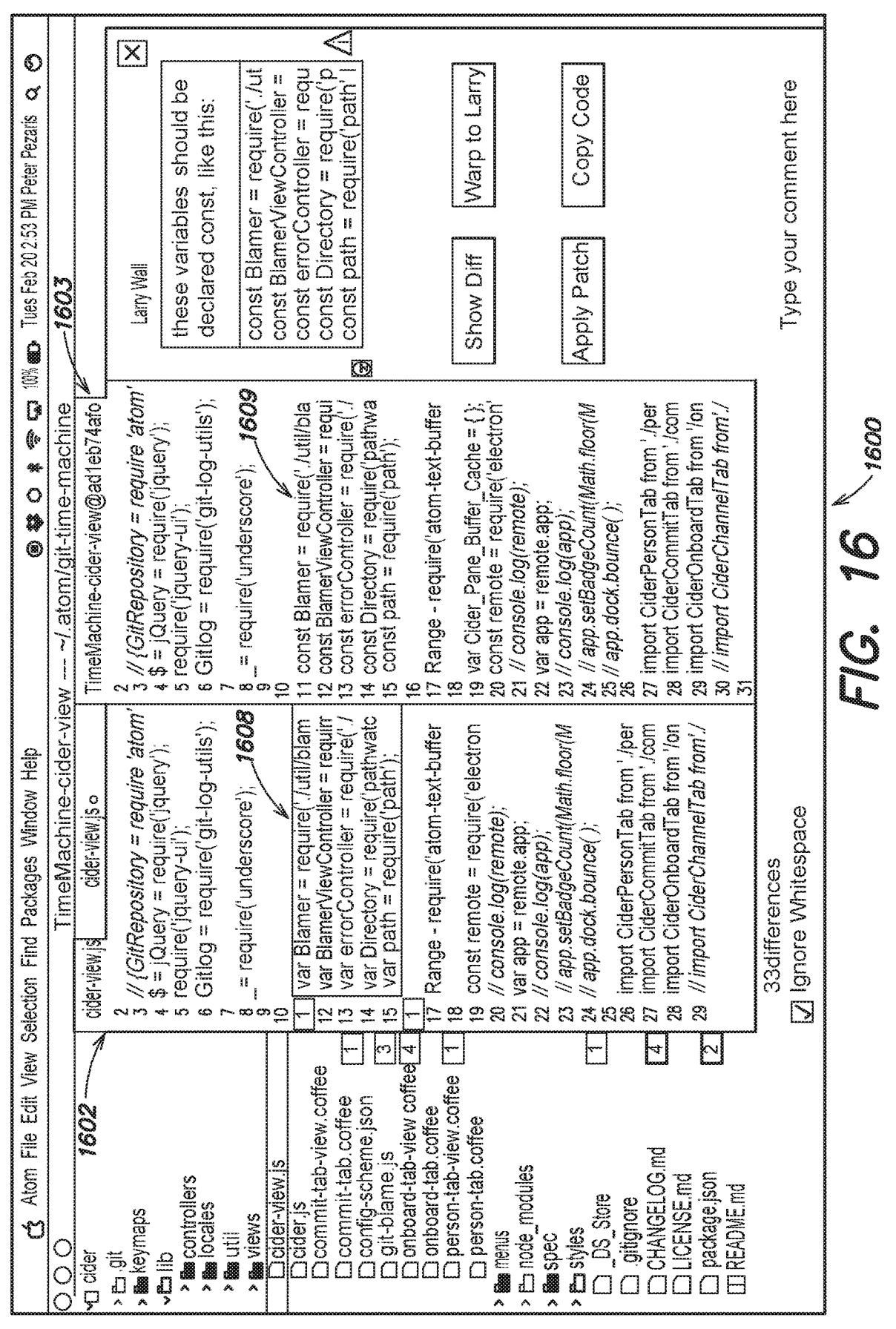

FIG. 16 illustrates an example UI 1600 showing the result of selecting the warp function. Selecting the warp function may allow the message recipient to compare his version of the code 1608 in editing panel 1602 with the message sender's version of the code 1609 in editing panel 1603. For example, the sender of the message 1301 may be identified as "Larry Wall," and on selection of option 1320 to "Warp to Larry." the system may generate editing panel 1602 with code 1608 (corresponding to the original code 1308) and editing panel 1603 with code 1609 (corresponding to the sender's modified code 1409). In this illustrative example, the user or recipient can view his version of the code, e.g., code 1608, in one half of the screen and the message sender's code in the other half of the screen, e.g., code 1609. Differences in code 1608 and code 1609 may be shown using annotation visual elements, e.g., using markup language.

FIG. 17 is an example process flow 1700 for determining one or more differences between live copies of a codeblock. According to one embodiment, two users. A and B, may each have a live copy of a codeblock displayed on their respective systems. The live copy refers to one or more lines of code or a code file that include code that may have been modified but not yet saved to a local storage device. The live copy of the codeblock may also be referred to as the visualized instance of the codeblock. The live copy is a version of the codeblock that may differ from a saved copy, which may in turn differ from a committed copy of the codeblock. The saved copy refers to one or more lines of code or a code file that include code that may have been modified and saved to a local storage device but not yet committed to a remote storage device. e.g., a code repository. The saved copy of the codeblock may also be referred to as the local instance of the codeblock. The committed copy refers to one or more lines of code or a code file stored in a remote storage device, e.g., a code repository. The committed copy may additionally be classified as belonging a particular version stored in the code repository. The committed copy of the codeblock may also be referred to as the remote instance of the codeblock.

In one embodiment, determining one or more differences. e.g., across live copies of the codeblock for users A and B, requires analyzing and comparing the live copy, the saved copy and/or the committed copy of the codeblock for user A and the live copy, the saved copy and/or the committed copy of the codeblock for user B. In some examples, the system can maintain metadata information on changes made locally to code on a user system and compare metadata information on multiple users systems to determine any changes.

According to one aspect, given the complexity of determining differences, e.g., across live copies of the codeblock for users A and B, the system is augmented to resolve these complex comparisons based on executing a difference engine. In one embodiment, the difference engine can be configured to execute the process flow described with respect to FIG. 17. In various embodiments, the difference engine is configured to manage code changes dynamically over time and between users. In other embodiments, the system can execute the same functions with or without instantiating a difference engine.

In one embodiment, the difference engine stores metadata that is associated with a code change and that details a codeblock associated with the code change. The difference engine preserves an association to the codeblock. The difference engine can be configured to generate and/or maintain the associations to codeblocks open on a computer as a live copy, preserved as saved copy, a committed copy, or another suitable version of the codeblock that can be modified (e.g., additional code added, deleted, renumbered, moved). The preservation may include reassigning the codeblock to include new code, deleted old code, or moved old code. In one embodiment, the difference engine identifies one or more differences between the visualized instance of the codeblock, associated with user A, and another instance of the codeblock, associated with user B. The difference engine may initiate the identification by determining, based on the metadata, whether the visualized instance of codeblock (e.g., a live copy) has been modified subsequent to storage of a local instance of the first version. Further details are provided below.

Referring to FIG. 17, in this illustrative embodiment, the live copies of the codeblock for users A and B (live copy A, 1702; live copy B 1704) are compared to determine if there are any differences present across the live copies. Initially, the live copy of the codeblock for user B (live copy B, 1704) is compared with a saved copy of the codeblock for user B (saved copy B. 1706). If it is determined that live copy B has been modified since saved copy B was last stored in local storage, a first set of differences between saved copy B and live copy B is determined (e.g., accounting for differences between saved copy B and live copy B). For example, the difference engine may compare each corresponding line of live copy B and saved copy B to determine the lines that have changed across the two copies. In another example, the difference engine may employ a heuristic-based searched algorithm to determine common portions between saved copy B and live copy B and subsequently compare the remaining portions to determine the first set of differences. If it is determined that live copy B has not been modified since saved copy B was last stored in local storage (e.g., live copy B has not been edited since last saved copy B), the next step in process flow 1700 may be executed.

Next, the saved copy of the codeblock for user B (saved copy B. 1706) is compared with a committed copy of the codeblock for user B (committed copy B, 1708). If it is determined that saved copy B has been modified since committed copy B was last stored in remote storage, a second set of differences between committed copy B and the first set of differences is determined (e.g., accounting for differences between committed copy B and saved copy B).

If it is determined that saved copy B has not been modified since committed copy B was last stored in remote storage, the next step in process flow 1700 may be executed.

Next, the committed copy of the codeblock for user B (committed copy B, 1708) is compared with a committed copy of the codeblock for user A (committed copy A, 1710). If it is determined that committed copy B does not correspond to committed copy A, a third set of differences between committed copy A and the second set of differences is determined (e.g., accounting for differences in both committed copies because they belong to different control versions in a code repository). If it is determined that committed copy B corresponds to committed copy A (e.g., both committed copies belong to the same control version in a code repository), the next step in process flow 1700 may be executed.

Next, the committed copy of the codeblock for user A (committed copy A. 1710) is compared with a saved copy of the codeblock for user A (saved copy A, 1712). If it is determined that saved copy A has been modified since committed copy A was last stored in remote storage, a fourth set of differences between saved copy A and the third set of differences is determined (e.g., accounting for differences between committed copy A and saved copy A). If it is determined that saved copy A has not been modified since committed copy A was last stored in remote storage (e.g., saved copy A has not been edited since last committed copy A), the next step in process flow 1700 may be executed.

Next, the saved copy of the codeblock for user A (saved copy A. 1712) is compared with a live copy of the codeblock for user A (live copy A. 1702). If it is determined that live copy A has been modified since saved copy A was last stored in local storage, a fifth set of differences between live copy A and the fourth set of differences is determined (e.g., accounting for differences between saved copy A and live copy A). If it is determined that live copy A has not been modified since saved copy A was last stored in remote storage (e.g., live copy A has not been edited since last saved copy A), the next step in process flow 1700 may be executed.

If no differences are identified across all comparisons described above, an indication is generated for display notifying the user that no differences have been identified between live copy A and live copy B. If one or more differences are identified across one or more of the comparisons described above, an indication is generated for display notifying the user that one or more differences have been identified between live copy A and live copy B. In one embodiment, a user interface panel is generated to display the one or more differences between the live copy of the codeblock for user A and the live copy of the codeblock for user B. The differences may be generated for displayed in the user interface panel based on the fifth set of differences. Alternatively, if the fifth set of differences was not determined (e.g., because there were no differences identified in the corresponding step), the fourth set of differences may be used for generating the display, and so on. Moreover, though the illustrated example is discussed with respect to live copies of the codeblock for different users, the systems and methods described are equally applicable to identifying differences across live copies, saved copies, committed copies, or other suitable versions of a codeblock for different users.

In one embodiment, when generating for display in the user interface panel the one or more differences, one or both of the live copies of the codeblock for users A and B are displayed. Additionally, each difference between the live copies may be annotated in the user interface panel for display to the user. For example, the annotations may be determined based on the fifth set of differences or another suitable set from the comparisons described above. In one embodiment, the user interface panel may generate, for display to user A, an apply function (e.g., apply patch) to change the live copy of the codeblock for user A to conform with the live copy of the codeblock for user B. Additionally, the user interface panel may generate, for display to user A, a revert function (e.g., revert patch) to revert to the visualized instance of the first version of the codeblock. In one embodiment, the user interface panel may generate, for display to user B, an apply function (e.g., apply patch) to change the live copy of codeblock for user B to conform with the live copy of the codeblock for user A. Additionally, the user interface panel may generate, for display to user B, a revert function (e.g., revert patch) to revert to the visualized instance of the first version of the codeblock.

According to one embodiment, a communication system can include one or more APIs for integrating VCS applications or services, as well as APIs for maintain IDE functionality and real time communication channels in cloud provided resources.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Use of ordinal terms such as "first," "second," "third." "a," "b," "c." etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A communication system for augmenting a software development environment, the system comprising:
    at least one processor operatively connected to a memory;
    a development engine, executed by the at least one processor, configured to manage access to a code repository and version control application;
    a communication engine, executed by the at least one processor, configured to enable user based communication and display a communication interface in conjunction with a code editor and code navigation menu;
    a tracking engine, executed by the at least one processor, configured to store user based communications with associations to code line or code file to respective user based communication;
    an interface engine, executed by the at least one processor, configured to generate a communication panel in conjunction with a code editing panel, wherein the communication panel is configured to display a message stream of user based communication associated with code displayed in the code editing panel;
    wherein the interface engine is further configured to display a communication interface for displaying a text input section and accepting user input text, via the text input section, for the user based communication;
    wherein the user based communication accepted by the communication interface is associated with a codeblock and a reference to the codebiock is embedded into the user based communication;
    wherein the interface engine is further configured to:
    determine whether the user based message relates to the codeblock;
    identify the codeblock based on the text of the user based communication; and
    in response to determining that the user based communication relates to a codeblock and the identifying of said codeblock, visually distinguish the user based communication in the communication panel to indicate this relationship to the user.

2. A communication system for augmenting a software development environment, the system comprising:
    at least one processor operatively connected to a memory;
    a development engine, executed by the at least one processor, configured to manage access to a code repository and version control application;
    a communication engine, executed by the at least one processor, configured to enable user based communication and display a communication interface in conjunction with a code editor and code navigation menu;
    a tracking engine, executed by the at least one processor, configured to store user based communications with associations to code line or code the to respective user based communication;
    an interface engine, executed by the at least one processor, configured to generate a communication pan& in conjunction with a code editing panel, wherein the communication panel is configured to display a message stream of user based communication associated with code displayed in the code editing panel;
    wherein the interface engine is further configured to display a communication interface providing a text input section for receiving text input for the user based communication;
    wherein the user based communication accepted by the communication interface is associated with a codeblock and a reference to the codeblock embedded into the user based communication;
    wherein the interface engine is further configured to:
    receive a modification of the code in the code editing panel, wherein the modification comprises the addition of code, deletion of code, renumbering of code, and/or moving of code; and
    in response to receiving the modification, store metadata for preserving communication thread linkage between modified code and the message stream associated with the code in the code editing panel, wherein the metadata comprises information associated with the location of the code the, location of the code line, position of the code line, number of code lines, message streams and/or user based communications.

3. The system of claim 2, wherein the act of preserving further comprises:

store, in the metadata, a first identification of the code in the code editing panel and/or a second identification of the modified code.

4. The system of claim 3, wherein one or both of the first identification and the second identification is a commit identification.

5. The system of claim 2, wherein the act of preserving further comprises:
   identify a recipient of the user based message in the message stream; and
   annotate, in the metadata, the recipient with respect to the user based message.

6. The system of claim 5, wherein the act of identifying the recipient of the user based message in the message stream comprises:
   distinguish between a target user for the user based message and another user mentioned in the user based message; and
   select the target user as the recipient of the user based message.

7. The system of claim 2, wherein the act of preserving further comprises:
   determine whether the modification comprises deletion of at least a portion of the code in the code editing panel; and
   in response to determining that the modification comprises deletion:
      visually indicate, in the code editing panel, a portion corresponding to the deleted code; and
      store, in the metadata, one or more user based messages in the message stream corresponding to the deleted code.

8. The system of claim 2, wherein the interface engine is further configured to:
   generate, by the at least one processor, a user interface panel configured to display one or more differences between the code in the code editing panel and the received modification of the code.

9. The system of claim 2, wherein the interface engine is further configured to:
   generate, by the at least one processor, a user interface panel configured to display an apply function to change the code in the editing panel based on the received modification of the code.

10. The system of claim 9, wherein the user interface panel is further configured to display a revert function to revert the code in the editing panel to a version prior to the code being changed.

11. A communication system for augmenting a software development environment, the system comprising:
    at least one processor operatively connected to a memory;
    a development engine, executed by the at least one processor, configured to manage access to a code repository and version control application;
    a communication engine, executed by the at least one processor, configured to enable user based communication and display a communication interface in conjunction with a code editor and code navigation menu;
    a tracking engine, executed by the at least one processor, configured to store user based communications with associations to code line or code file to respective user based communication;
    an interface engine, executed by the at least one processor, configured to generate a communication panel in conjunction with a code editing panel, wherein the communication panel is configured to display a message stream of the user based communication associated with code displayed in the code editing panel;
    wherein the communication interface provides a text input section and receives user input text for the user based communication;
    wherein the user based communication received by the communication interface is associated with a codeblock and a reference to the codeblock is embedded into the user based communication;
    wherein the interface engine is further configured to:
    dynamically monitor the message stream for code; and
    in response to detecting code in the message stream, determine corresponding code in the code editing panel.

12. The system of claim 11, wherein the act of determining corresponding code in the code editing panel comprises:
    execute a heuristic-based search algorithm to identify the corresponding code based on the code detected in the message stream.

13. A computer implemented method for augmenting a software development environment, the method comprising:
    managing, by at least one processor, access to a code repository and version control application;
    generating, by the at least one processor, a communication interface integrated into a code editor and code navigation display;
    storing, by the at least one processor, user based communications and associations to one or more code lines or code files for respective user based communication;
    generating, by the at least one processor, a communication panel in conjunction with a code editing panel, wherein the communication panel is configured to display a message stream of user based communication associated with code displayed in the code editing panel;
    displaying a communication interface having a text input user interface control for accepting user input text, via the text input user interface control, for the user based communication;
    wherein the user based communication accepted by the communication interface is associated with a codeblock and a reference to the codeblock is embedded into the user based communication;
    determining whether the user based message relates to the codeblock;
    identify the codeblock based on the text of the user based communication; and
    in response to determining that the user based communication relates to a codeblock and the identifying of said codeblock, visually distinguishing the user based communication in the communication panel to indicate this relationship to the user.

14. A computer implemented method for augmenting a software development environment, the method comprising:
    managing, by at least one processor, access to a code repository and version control application;
    generating, by the at least one processor, a communication interface integrated into a code editor and code navigation display;
    storing, by the at least one processor, user based communications and associations to one or more code lines or code files for respective user based communication;
    generating, by the at least one processor, a communication panel in conjunction with a code editing panel, wherein the communication panel is configured to display a message stream of user based communication associated with code displayed in the code editing panel;

wherein the communication interface displays a text input section to receive user input text for the user based communication;

wherein the user based communication received by the communication interface is associated with a codeblock and a reference to the codeblock is embedded into the user based communication;

receiving a modification of the code in the code editing panel, wherein the modification comprises the addition of code, deletion of code, renumbering of code, and/or moving of code; and in response to receiving the modification, storing metadata for preserving communication thread linkage between modified code and the message stream associated with the code in the code editing panel, wherein the metadata comprises information associated with the location of the code file, location of the code line, position of the code line, number of code lines, message streams and/or user based communications.

15. The method of claim 14, wherein the act of preserving further comprises:
storing, in the metadata, a first identification of the code in the code editing panel and/or a second identification of the modified code.

16. The method of claim 15, wherein one or both of the first identification and the second identification is a commit identification.

17. The method of claim 14, wherein the act of preserving further comprises:
identifying a recipient of the user based message in the message stream; and annotating, in the metadata, the recipient with respect to the user based message.

18. The method of claim 17, wherein the act of identifying the recipient of the user based message in the message stream comprises:
distinguishing between a target user for the user based message and another user mentioned in the user based message; and
selecting the target user as the recipient of the user based message.

19. The method of claim 14, wherein the act of preserving further comprises:
determining whether the modification comprises deletion of at least a portion of the code in the code editing panel; and
in response to determining that the modification comprises deletion:
visually indicating, in the code editing panel, a portion corresponding to the deleted code; and
storing, in the metadata, one or more user based messages in the message stream corresponding to the deleted code.

20. The method of claim 14, the method further comprising:
generating, by the at least one processor, a user interface panel configured to display one or more differences between the code in the code editing panel and the received modification of the code.

21. The method of claim 14, the method further comprising:
generating, by the at least one processor, a user interface panel configured to display an apply function to change the code in the editing panel based on the received modification of the code.

22. The method of claim 21, wherein the user interface panel is further configured to display a revert function to revert the code in the editing panel to a version prior to the code being changed.

23. A computer implemented method for augmenting a software development environment, the method comprising:
managing, by at least one processor, access to a code repository and version control application;
generating, by the at least one processor, a communication interface integrated into a code editor and code navigation display;
storing, by the at least one processor, user based communications and associations to one or more code lines or code files for respective user based communication;
generating, by the at least one processor, a communication panel in conjunction with a code editing panel, wherein the communication panel is configured to display a message stream of the user based communication associated with code displayed in the code editing panel;
wherein the communication interface displays an input text box and the input text box accepts user input text for the user based communication;
wherein the user based communication accepted by the communication interface is associated with a codeblock and a reference to the codeblock is embedded into the user based communication;
dynamically monitoring the message stream for code; and
in response to detecting code in the message stream, determining corresponding code in the code editing panel.

24. The method of claim 23, wherein the act of determining corresponding code in the code editing panel comprises:
executing a heuristic-based search algorithm to identify the corresponding code based on the code detected in the message stream.

* * * * *